US006315669B1

(12) United States Patent
Okada et al.

(10) Patent No.: US 6,315,669 B1
(45) Date of Patent: Nov. 13, 2001

(54) PORTABLE COLOR DISPLAY GAME MACHINE AND STORAGE MEDIUM FOR THE SAME

(75) Inventors: Satoru Okada; Ryuji Umezu; Takanobu Nakashima, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/321,201

(22) Filed: May 27, 1999

Related U.S. Application Data

(60) Provisional application No. 60/123,745, filed on Mar. 10, 1999, and provisional application No. 60/112,181, filed on Dec. 15, 1998.

(30) Foreign Application Priority Data

May 27, 1998 (JP) .................................. 10-145620

(51) Int. Cl.[7] .................................................. A63F 9/24
(52) U.S. Cl. ................... 463/44; 463/31; 463/30
(58) Field of Search ................... 463/1, 30, 31, 463/43–47; 345/214, 690, 814, 866, 530–535

(56) References Cited

U.S. PATENT DOCUMENTS

| Re. 35,520 | 5/1997 | Darling et al. |
| 4,481,529 | 11/1984 | Kerling. |
| 4,516,777 | 5/1985 | Nikora. |
| 4,542,903 | 9/1985 | Yokoi et al. |
| 4,628,304 | 12/1986 | Bottiau. |
| 4,703,318 | * 10/1987 | Haggerty ........................... 346/723 |

(List continued on next page.)

FOREIGN PATENT DOCUMENTS

| 11-207034 | 8/1999 | (EP). |
| 0 960 637 | 12/1999 | (EP). |
| 63-242293 | 10/1988 | (JP). |
| 4-49989 | 2/1992 | (JP). |
| 4-140791 | 5/1992 | (JP). |
| 4-140792 | 5/1992 | (JP). |
| 7-204349 | 8/1995 | (JP). |
| 10-137447 | 5/1998 | (JP). |
| 10-328408 | 12/1998 | (JP). |
| 11-333144 | 12/1999 | (JP). |

OTHER PUBLICATIONS

Computer Closet Collection, NEC Turbo Express, printed from wysiwyg://22/http://www.geocities.com/~compcloset/NECTurboExpress.htm on Sep. 28, 2000 (2 pages), copyright 1997–1999, last modified Jun. 24, 1999.

NEC Turbo Express, printed from http://www.edu.uni-klu.ac.at/~kseiner/express.html on Sep. 28, 2000 (2 pages), document date unknown.

(List continued on next page.)

*Primary Examiner*—Mark Sager
*Assistant Examiner*—John M Hotaling, II
(74) *Attorney, Agent, or Firm*—Nixon & Vanderhye P.C.

(57) ABSTRACT

A portable color display game machine includes a game cartridge type determining circuit configured to determine whether a color game cartridge storing color data for a game or a monochrome game cartridge storing monochrome data for a game is attached to the color display game machine. Color display generating circuitry is configured to generate a color game display based on the color data when the color game cartridge is attached to the color display game machine, and to generate a color game display based on the monochrome data when the monochrome game cartridge is attached to the color display game machine.

24 Claims, 20 Drawing Sheets

U.S. PATENT DOCUMENTS

| | | |
|---|---|---|
| 4,922,420 | 5/1990 | Nakagawa et al. . |
| 4,924,413 | 5/1990 | Suwannukul . |
| 4,931,860 | 6/1990 | Narumiya . |
| 4,977,398 * | 12/1990 | Pleva et al. ............................ 340/793 |
| 4,979,738 | 12/1990 | Frederiksen . |
| 5,023,603 * | 6/1991 | Wakimoto et al. .................. 340/793 |
| 5,095,798 | 3/1992 | Okada et al. . |
| 5,109,504 * | 4/1992 | Littleton ............................... 395/500 |
| 5,134,391 | 7/1992 | Okada . |
| 5,184,830 | 2/1993 | Okada et al. . |
| 5,245,327 * | 9/1993 | Pleva et al. ............................ 345/147 |
| 5,265,888 | 11/1993 | Yamamoto et al. . |
| 5,300,944 | 4/1994 | Shapiro et al. . |
| 5,395,112 | 3/1995 | Darling . |
| 5,400,053 | 3/1995 | Johary et al. . |
| 5,412,800 | 5/1995 | Bril et al. . |
| 5,442,375 | 8/1995 | Wojaczynski et al. . |
| 5,509,663 * | 4/1996 | Otake et al. ............................ 463/30 |
| 5,552,799 | 9/1996 | Hashiguchi . |
| 5,556,108 | 9/1996 | Nagano et al. . |
| 5,559,954 | 9/1996 | Sakoda et al. . |
| 5,659,673 * | 8/1997 | Nonoshita ............................ 395/131 |
| 5,759,104 | 6/1998 | Shirae et al. . |
| 5,785,598 | 7/1998 | Hsu . |
| 5,790,096 | 8/1998 | Hill, Jr. . |
| 5,793,351 | 8/1998 | Leach . |
| 5,844,532 | 12/1998 | Silverbrook et al. . |
| 5,854,620 | 12/1998 | Mills et al. . |
| 5,892,939 | 4/1999 | Call et al. . |
| 5,959,596 | 9/1999 | McCarten et al. . |
| 6,020,751 | 2/2000 | Rampone et al. . |
| 6,047,373 | 4/2000 | Hall et al. . |
| 6,115,054 | 9/2000 | Giles . |
| 6,132,315 | 10/2000 | Miyamoto et al. . |

OTHER PUBLICATIONS

Turbo Express FAQ, printed from http://www.gameconsoles.com/turboexp_faq.htm on Sep. 28, 2000 (18 pages), last revision of document: May 25, 1995.

Computer Closet Collection, Sega Game Gear, printed from wysiwyg://28/http://www.geocities.com/~compcloset/SegaGameGear.htm on Sep. 28, 2000 (2 pages), copyright 1997–1999, last modified Jun. 22, 1999.

The Real Game Gear FAQ, Version GG.04, Dec. 1999, printed form http://www.classicgaming.com/museum/realg-gfaq.txt on Sep. 28, 2000 (32 pages).

Computer Closet Collection, Atari Lynx, printed from wysiwyg://12/http://www.geocities.com/~compcloset/AtariLynx.htm on Sep. 28, 2000 (2 pages), copyright 1997–1999, last modified Jun. 22, 1999.

[FAQ ] Atari Lynx Frequently–Asked Questions, printed from http://www.landfield.com/faqs/games/video–games/atari/lynx on Sep. 28, 2000 (16 pages), last revision of document: May 1, 2000.

Computer Closet Collection, Nintendo Game Boy/Game Boy Light, printed from wysiwyg://40/http://www.geocities.com/~compcloset/NintendoGameBoy.htm on Sep. 28, 2000 (5 pages), copyright 1997–1999, last modified Jun. 22, 1999.

Computer Closet Collection, Milton–Bradley Microvision, printed from wysiwyg://52/http://www.geocities.com/~compcloset/MiltonBradley–Microvision.htm on Sep. 28, 2000 (2 pages), copyright 1997–1999, last modified Jun. 22, 1999.

Microvision FAQ Version 0.08, copyright 1994, 1995, printed from http://www.gameconsoles.com/microvision_faq.htm on Sep. 28, 2000 (13 pages).

Computer Closet Collection, Sega Nomad, printed form wysiwyg://34/http://www.geocities.com/~compcloset/Sega-Nomad.htm on Sep. 28, 2000 (2 pages), copyright 1997–1999, last modified Jun. 22, 1999.

Sega Nomad Press Announcement of Aug. 22, 1995, printed from http://gamezero.com/team–0/whats_new/past/nomad.html on Sep. 28, 2000 (2 pages).

Computer Closet Collection, Tiger Game.com, printed from wysiwyg://46/http://www.geocities.com/~ompcloset/TigerGameCom.htm on Sep. 28, 2000 (1 page), copyright 1997–1999, last modified Jun. 22, 1999.

Tiger Game.Com, "Low Cost, Big Games", printed from http://gamecenter.com/Consoles/Features/Pocket/ss02.html on Sep. 28, 2000 (2 pages), document date unknown.

* cited by examiner

FIG. 9

| | EXAMPLE OF BINARY NUMBER DISPLAY | | | | | | | | EXAMPLE OF HEXADECIMAL NUMBER DISPLAY |
|---|---|---|---|---|---|---|---|---|---|
| | 7 | 6 | 5 | 4 | 3 | 2 | 1 | 0 | |
| COLOR COMPATIBLE | 1 | 0 | 0 | 0 | 0 | 0 | 0 | 0 | (80) |
| COLOR NON-COMPATIBLE | 0 | 0 | 0 | 0 | 0 | 0 | 0 | 0 | (00) |

FIG. 10

| | EXAMPLE OF BINARY NUMBER DISPLAY | | | | | | | | EXAMPLE OF HEXADECIMAL NUMBER DISPLAY |
|---|---|---|---|---|---|---|---|---|---|
| | 7 | 6 | 5 | 4 | 3 | 2 | 1 | 0 | |
| BLACK-&-WHITE DISPLAY GAME MACHINE 1 | 0 | 0 | 0 | 0 | 0 | 0 | 0 | 1 | (01) |
| BLACK-&-WHITE DISPLAY GAME MACHINE 2 | 1 | 1 | 1 | 1 | 1 | 1 | 1 | 1 | (FF) |
| COLOR DISPLAY GAME MACHINE | 0 | 0 | 0 | 1 | 0 | 0 | 0 | 1 | (11) |

FIG. 21
EXAMPLE OF COLOR PALETTE SELECT WINDOW DISPLAY
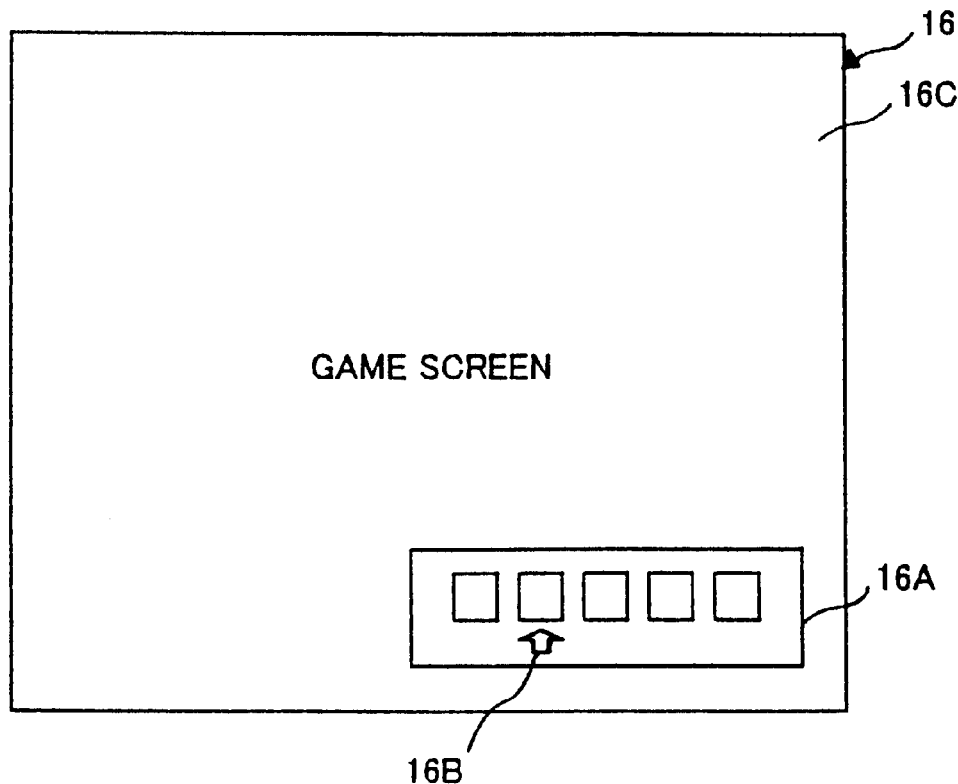
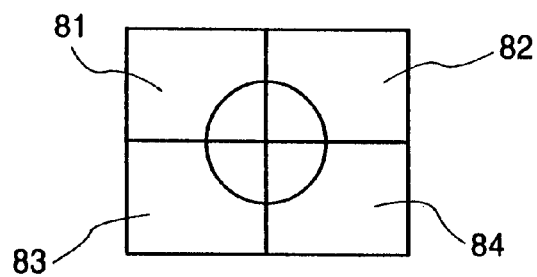
FIG. 23

PORTABLE COLOR DISPLAY GAME MACHINE AND STORAGE MEDIUM FOR THE SAME

RELATED APPLICATIONS

This application claims priority under 35 U.S.C. Section 119 from Application No. H10-145620 filed in Japan on May 27, 1998. The contents of Application No. H10-145620 are hereby incorporated by reference.

This application also claims priority under 35 U.S.C. Section 119 from Application No. 60/112,181 filed in the United States on Dec. 15, 1998 and Application No. 60/123,745 filed in the United States on Mar. 10, 1999. The contents of Application Nos. 60/112,181 and 60/123,745 are hereby incorporated by reference.

FIELD OF THE INVENTION

The present invention relates to a portable or hand-held color display game machine and a storage medium for the game machine and, more particularly, to a portable color display game machine to which one of a first storage medium storing, for example, tone (gradation) data for monochrome (black-and-white) display, and a second storage medium storing, for example, color data for color display can be selectively attached, and the storage media.

BACKGROUND AND SUMMARY OF THE INVENTION

Portable game machines that use dot-matrix liquid crystal display devices for monochrome display are popular entertainment devices. An example of an 8-bit portable liquid crystal display-equipped game machine is the GAMEBOY® which is manufactured and sold by the assignee of this application. GAMEBOY is a registered trademark of Nintendo Co., Ltd. of Kyoto, Japan. The graphics of the GAMEBOY are created from blocks of pixels known as characters. Characters are typically 8 pixels wide and 8 pixels high (or 8 pixels wide and 16 pixels high) and are the smallest addressable unit of screen data for the GAMEBOY. Each pixel can be one of four shades of gray. Characters can be used to represent both background and object data. Backgrounds are groups of characters laid out like tiles to create the environment or background of a game. For backgrounds, a portion of memory corresponding to the screen is used to point to character data to be displayed at a given location. Objects are groups of character data that are used to represent the main game character and other moving objects that overlay the background in a game. Objects are sometimes referred to as "sprites". Objects also occupy a range of memory pointing to character data, but in addition they have other attributes such as screen location and priority. Thus, characters are displayed in monochrome tones on the screen of the liquid crystal display.

Japanese Patent Application Laid-Open No. HEI 7-204349 and counterpart U.S. Pat. No. 5,556,108 (the contents of which are incorporated herein) disclose a system in which a conversion device permits the use of a cartridge for one type of game machine with other different types of game machines. For example, the conversion device enables the display of originally monochrome images as color images. In this case, the conversion device is used with a game cartridge for a first type of game machine that displays monochrome images to generate image data for a second type of game machine capable of color display. This conventional technology makes it possible to display color images by providing the conversion device for color conversion processing between the cartridge and the second type of game machine.

However, while representing an improvement which permits the use of game cartridges with different type of game systems, the system described in the '108 patent requires that the conversion device be connected between the second type of game machine and the cartridge in order to color-display monochrome images. Moreover, background images and object images are color-converted by using only one color palette, so that the displayable colors are considerably limited.

SUMMARY OF THE INVENTION

Accordingly, an object of this invention is to provide a novel portable color display game machine.

It is another object of the invention to provide a portable color display game machine capable of color-displaying game characters regardless of whether the storage medium used therewith is a monochrome game cartridge or a color game cartridge.

It is still another object of the invention to provide portable color display game machine and a storage medium capable of color-displaying a background image and an object image using separate color palettes.

In accordance with one aspect of the present invention, a portable color display game machine includes a game cartridge type determining circuit configured to determine whether a color game cartridge storing color data for a game or a monochrome game cartridge storing monochrome data for a game is attached to the color display game machine. Color display generating circuitry is configured to generate a color game display based on the color data when the color game cartridge is attached to the color display game machine, and to generate a color game display based on the monochrome data when the monochrome game cartridge is attached to the color display game machine.

According to this invention, a portable color display game machine is provided that allows selective use of both the game cartridges storing monochrome data and game cartridges storing color data. Thus, monochrome game cartridges, used for conventional portable monochrome display game machines, can also be used in color display game machines. This makes good use of conventional software resources and expands the types of software that can be used in color display game machines.

In addition, separate color palettes may be set for the individual background characters and the individual object characters, making it possible to display color game images in many colors on the color LCD 16 while using a relatively small amount of palette data.

In addition, the processor of the portable color game machine may be set at one of a plurality of different clock speeds based on, for example, commands from the game program stored on the game cartridge. A higher clock speed improves performance when color games are used. A lower clock speed may be used for the color display of monochrome games to, for example, improve battery life.

BRIEF DESCRIPTION OF THE DRAWINGS

Other objects, features and advantages of the invention will also become apparent from the detailed description of embodiments made hereinafter with reference to the accompanying drawings of which:

FIG. 9 is a diagram illustrating examples of the color-readiness code and the color-unreadiness code;

FIG. 10 is a diagram illustrating examples of the machine identification data;

FIG. 21 is a diagram illustrating an example of the color palette selecting window;

FIG. 23 illustrates a circle displayed in a 2×2 character array.

DETAILED DESCRIPTION

Figure 1:
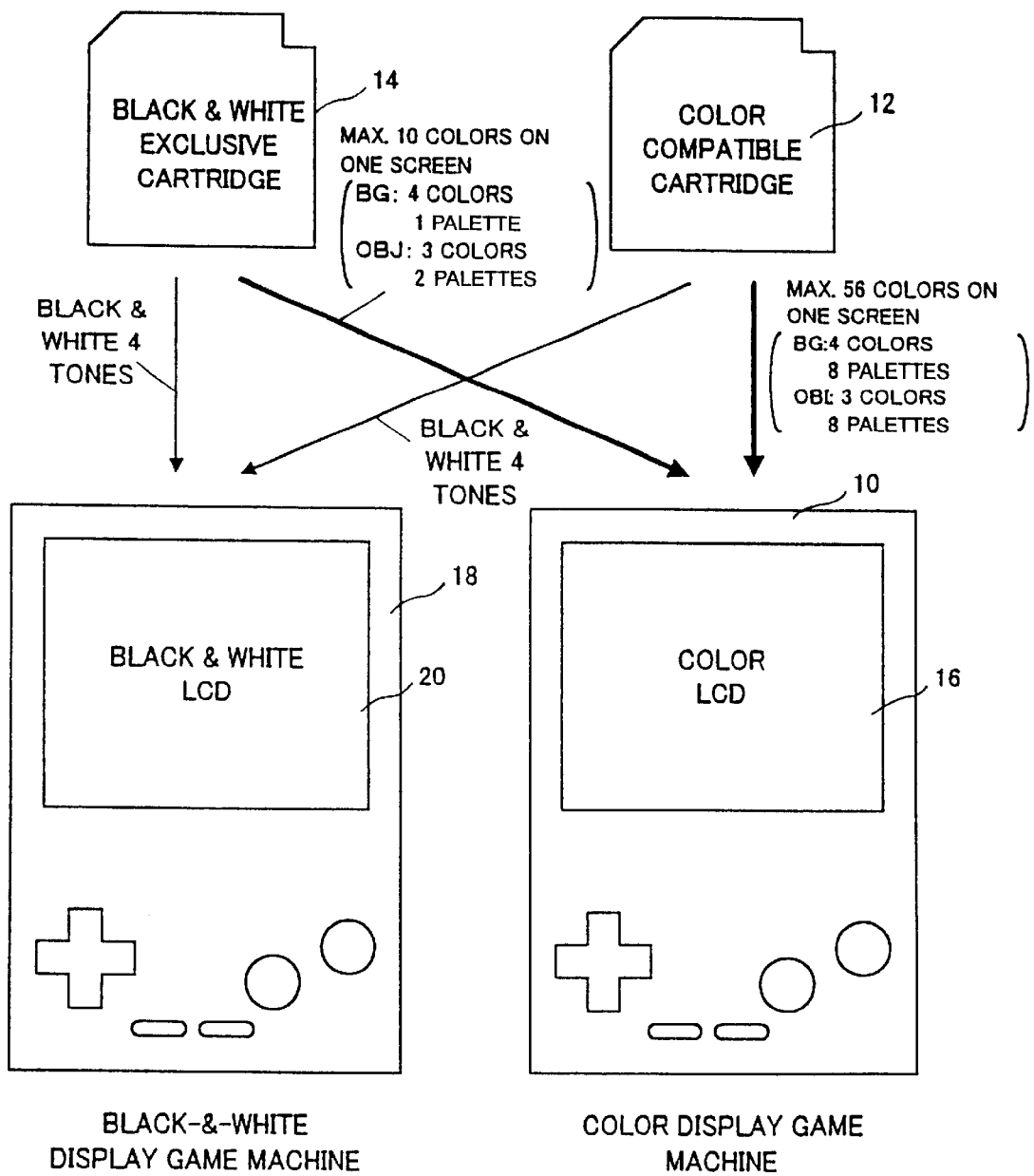
FIG. 1 is a diagram illustrating the mutually compatible correspondence between the monochrome-dedicated cartridge and the monochrome display game machine, and the color-ready cartridge and the color display game machine, to which the invention is directed.

FIG. 1 shows a portable color display game machine (hereinafter, referred to simply as "color display game machine") 10 which displays game characters in color on a color liquid crystal display (LCD) 16 when a color-ready game cartridge 12 or a monochrome-dedicated game cartridge 14 is selectively inserted into an insert opening or port thereof (not shown).

FIG. 1 also shows a portable monochrome display game machine (hereinafter, referred to simply as "monochrome display game machine") 18 which displays game characters on a monochrome LCD 20 in four monochrome tones (gradations) when the color-ready game cartridge 12 or the monochrome-dedicated game cartridge 14 is selectively inserted into the insert opening or port thereof (not shown).

As will be described in greater detail below, the color LCD 16 displays characters using, for example, up to a maximum of 56 colors if the color-ready game cartridge 12 is inserted into the color display game machine 10. If the monochrome-dedicated game cartridge 14 is used with the color display game machine 10, game characters are displayed using, for example, up to a maximum of ten colors. The color display game machine 10 uses different color palettes and displays the game characters in different numbers of colors depending on whether the color-ready game cartridge 12 or the monochrome-dedicated game cartridge 14 is used.

Figure 2:
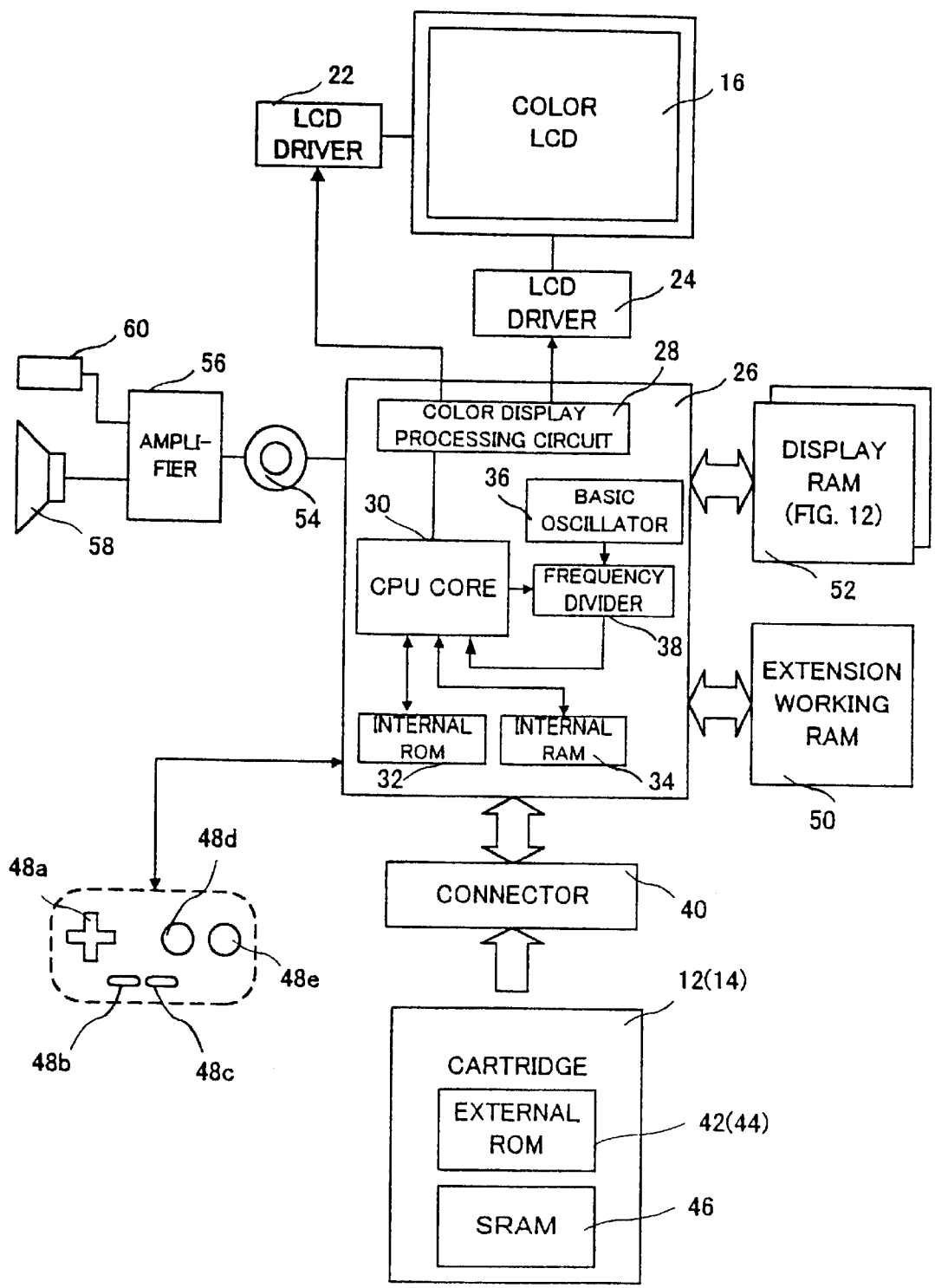
FIG. 2 is an overall block diagram of the color cartridge and the color display game machine according to an embodiment of the invention.

With reference to FIG. 2, the color display game machine 10 includes the color LCD 16 as described above. The color LCD 16 is formed as a dot matrix display and is driven by LCD drivers 22 and 24 to display color images on its screen. The LCD driver 22 selectively drives, for example, the rows of the dot matrix display and the LCD driver 24 selectively drives, for example, the columns of the dot matrix display. The LCD drivers 22, 24 are supplied with color image signals from a color display processing circuit 28 included in a central processing unit (CPU) 26.

Figure 11:
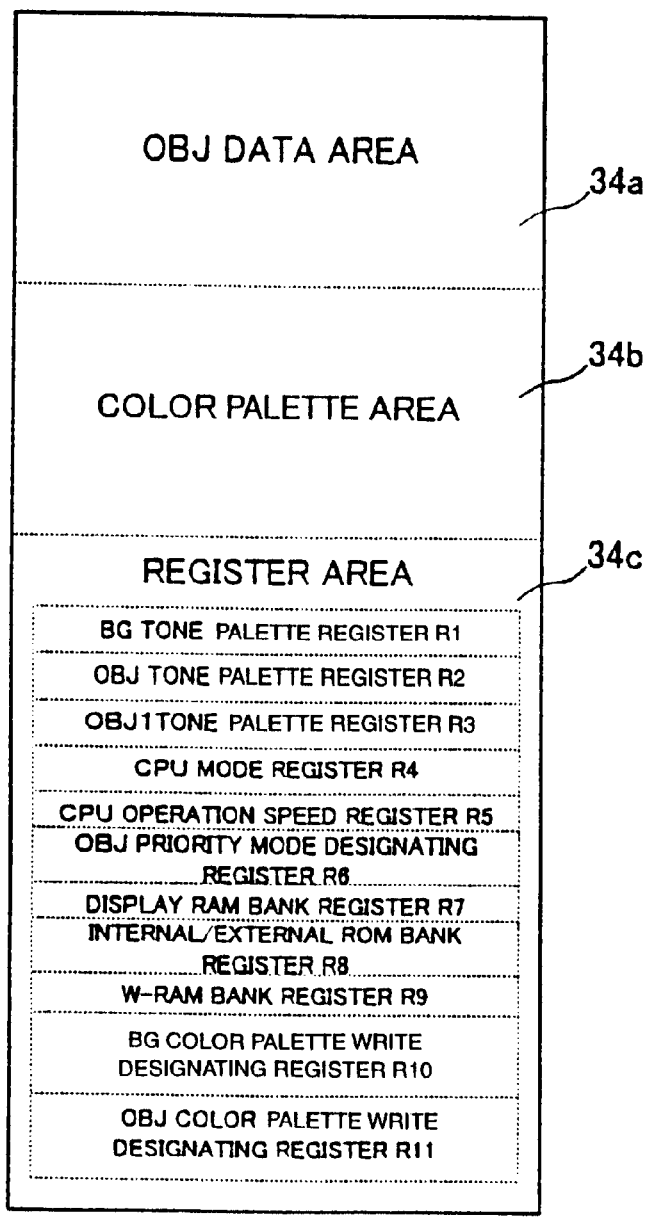
FIG. 11 is a diagram illustrating the memory map of the internal RAM.

The CPU 26 further includes a CPU core 30 which is connected to an internal read only memory (ROM) 32 and an internal random access memory (RAM) 34. The internal ROM 32 includes various data areas that are shown in detail in FIG. 7. The internal RAM 34 is used as a work memory of the CPU core 30, and has storage areas that are shown in detail in FIG. 11.

The CPU 26 further includes a basic oscillator 36. The basic oscillator 36 is formed of, for example, a quartz oscillator, and supplies an oscillating signal to a programmable frequency divider 38. The programmable frequency divider 38 divides the oscillating signal from the basic oscillator 36 in accordance with frequency division data from the CPU core 30, and supplies a divided signal as a clock of the CPU core 30.

Figure 4:
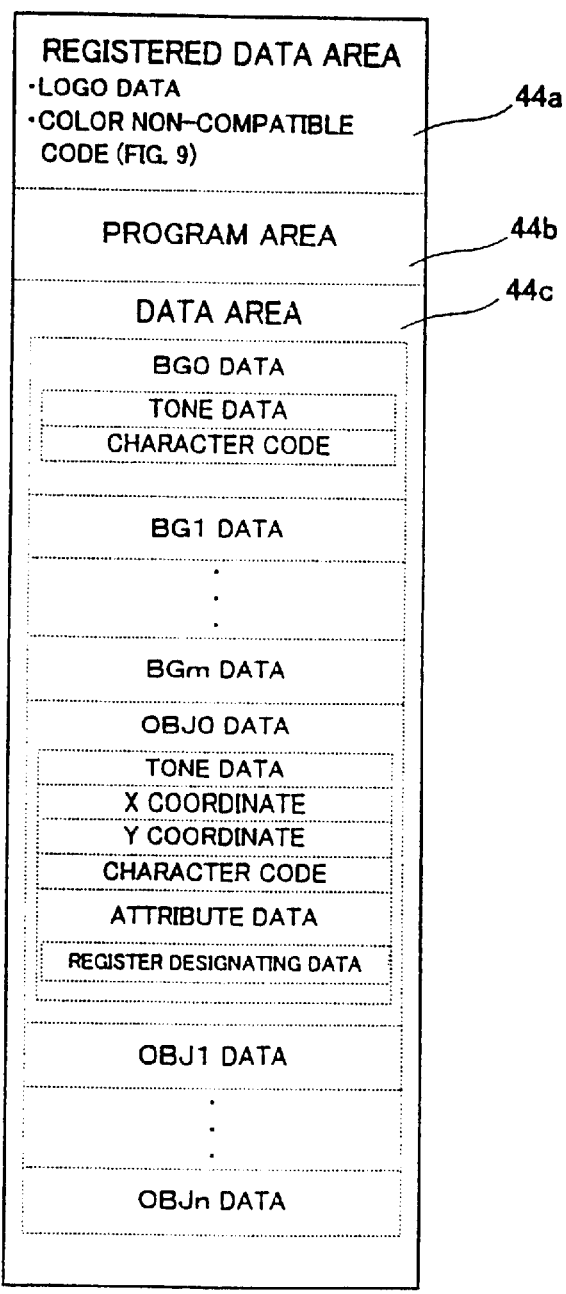
FIG. 4 is a diagram illustrating the memory map of the external ROM of the monochrome-dedicated cartridge (color-unready cartridge)
Figure 5:
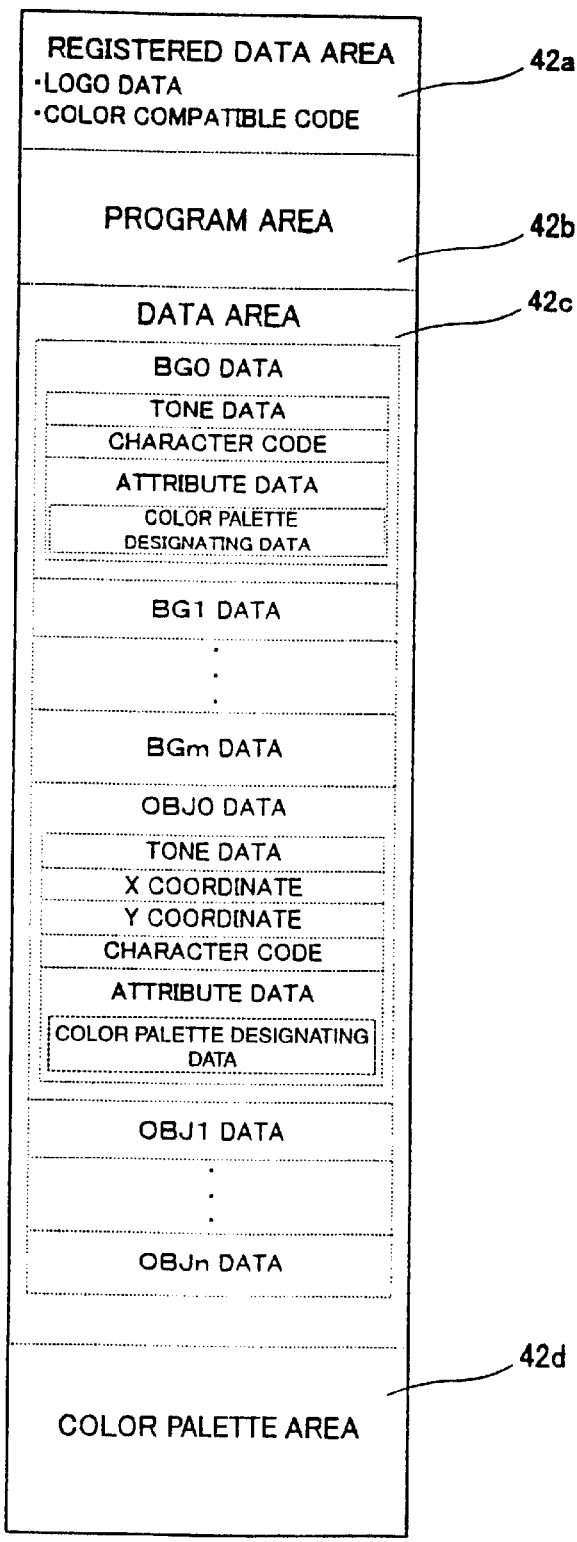
FIG. 5 is a diagram illustrating the memory map of the external ROM of the color-ready cartridge.
Figure 6:
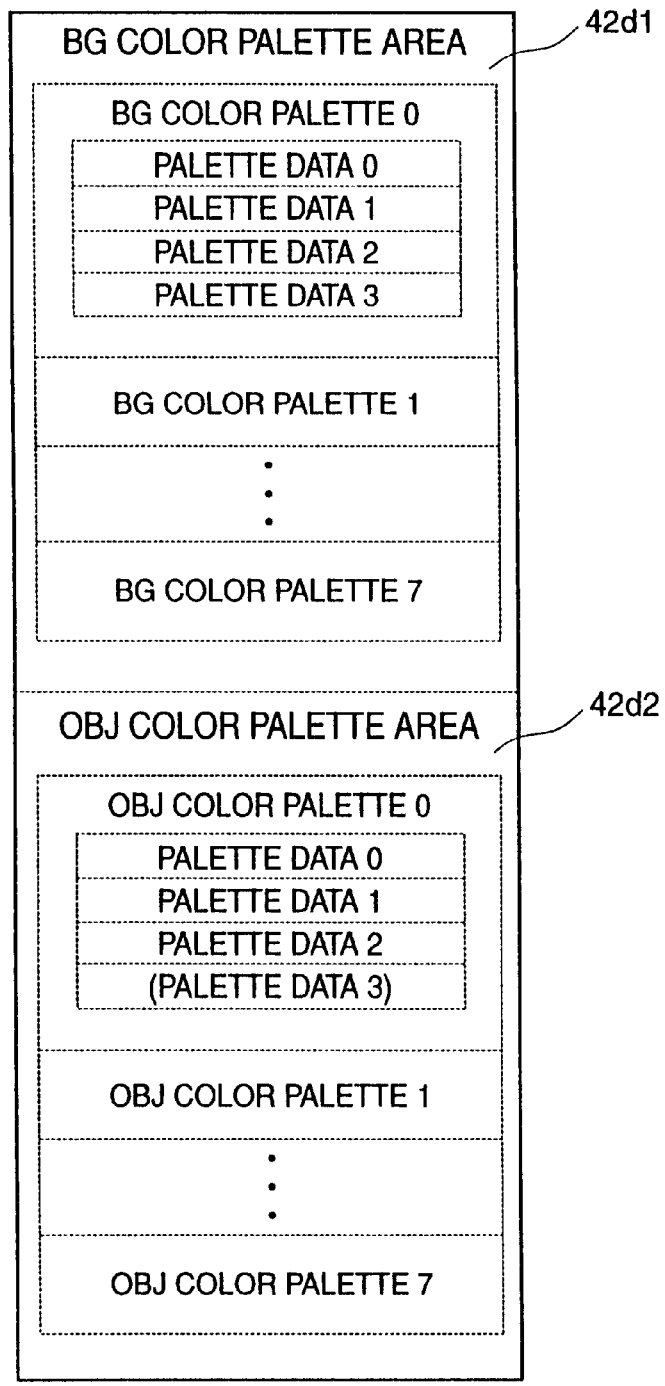
FIG. 6 is a diagram illustrating the detailed memory map of the color palette area.

A connector 40 is connected to the CPU 26 by an appropriate bus. The color-ready game cartridge 12 or the monochrome-dedicated game cartridge 14 shown in FIG. 1 is selectively attached to the connector 40. Each of the game cartridges 12 and 14 includes an external ROM 42 or 44 and an SRAM 46. In the case of the monochrome game cartridge 14, various data as shown in FIG. 4 are pre-stored in the external ROM 44. In the external ROM 42 of the color game cartridge 12, data shown in FIGS. 5 and 6 is pre-stored. The SRAM 46 of each game cartridge is used to store backup data of the game.

The CPU 26 is supplied with operation signals from operating keys 48a–48e. The operating key 48a is used to move a game character displayed on the color LCD 16 in four directions, that is, upward, downward, right and left. The operating key 48b is a select key that is used for, for example, game mode selection and the like. The operating key 48c is a so-called start key that is used to start playing the game or to temporarily stop the progress of the game. The operating keys 48d, 48e are push-button switches. By pushing the operating keys 48d, 48e, it is possible to cause various motions of the game characters displayed on the color LCD 16, for example, a weapon use, a jump and the like. The operating keys 48a–48e are disposed in a forward surface of the color display game machine 10 as shown in FIG. 1. A key matrix (not shown) is provided for sending the CPU 26 the operation signals from the operating keys 48a–48e as controller data.

Color display game machine 10 is powered by batteries (not shown). A power indicator LED (not shown) may dim as the batteries lose their charge, thereby providing a visual indication to the user that new batteries are needed. The color display game machine 10 may also be configured for connection to an AC adapter to permit extended play without batteries.

Figure 12:
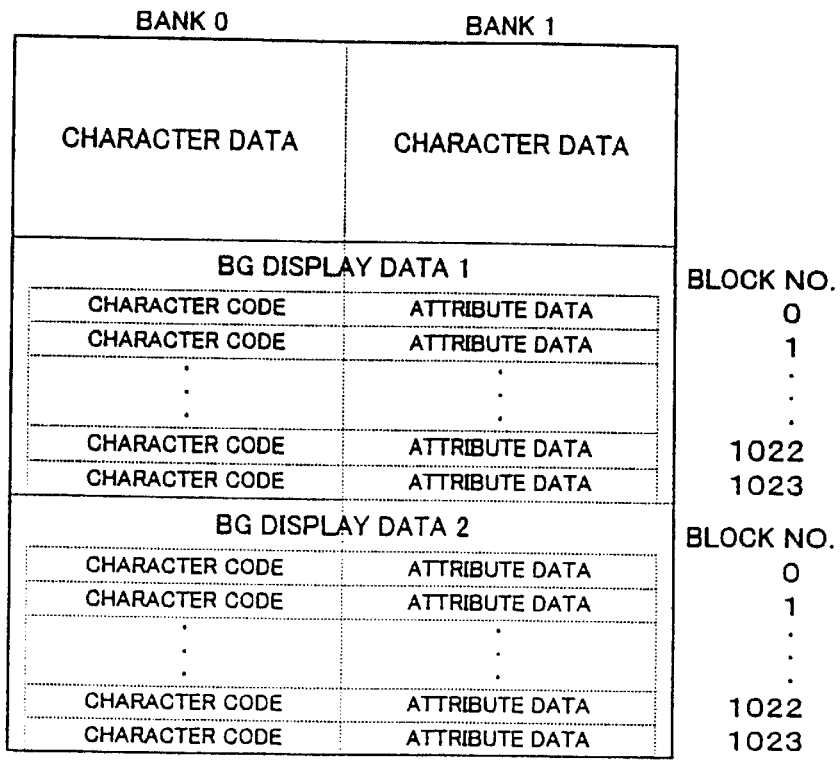
FIG. 12 is a diagram illustrating the memory map of the display RAM.

In accordance with the game program, character data supplied from the game cartridge 12 or 14 and the game control data from the operating keys 48a–48e, the CPU 26 executes data processing and writes display data into a display RAM 52, using an extended RAM 50 when necessary. As indicated in FIG. 12, the display RAM 52 has two banks, that is, a first bank and a second bank, and has, as a whole, a storage area that is greater than the display area of the color LCD 16, thereby enabling a scrolling display upward and downward and/or rightward and leftward on the screen of the color LCD 16.

As a result of the data processing by the CPU 26, sound signals to be output are adjusted in level by volume controls 54 and 56, and then outputted to a speaker 58 and/or an earphone jack 60. Sound signals output from the speaker 58 and/or the earphone jack 60 include game sound effects, voices and music.

Figure 3:
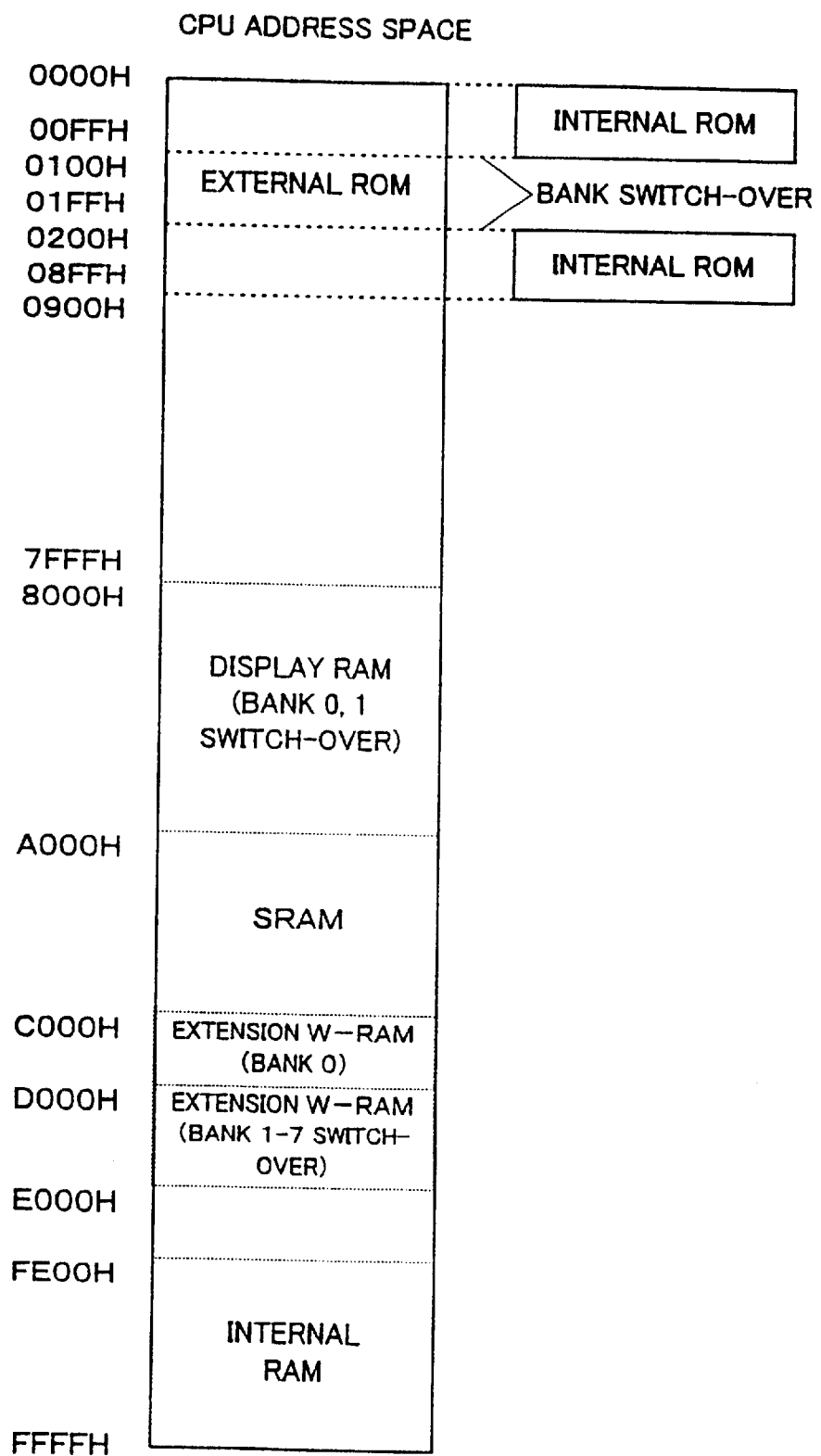
FIG. 3 is a diagram illustrating the accessible address spaces of the CPU.

The address spaces of the CPU 26 are shown in FIG. 3. When an internal/external ROM bank switching register R8 is "0", the internal ROM 32 (FIG. 2) of the CPU 26 is accessed at addresses "0000H-00FFH" (where "H" indicates the use of hexadecimal notation) or "0200H-08FFH", and the external ROM 42 or 44 is accessed using other ROM address spaces (0100H-01FFH, 0900H-7FFFH). When the internal/external ROM bank switching register R8 is "1", all the ROM address spaces access the external ROM 42 or 44. The display RAM 52 (FIG. 2) is accessed at addresses "8000H-9FFFH" with the switching between the first bank and the second bank. The addresses of the SRAM 46 (FIG. 2) of the cartridge 12 or 14 are "A000H-BFFFH". The addresses of the extended RAM 50 (FIG. 2) are "C000H-DFFFH". The home bank of the extended RAM 50, that is, bank 0, is allotted addresses "C000H-CFFFH", and the other banks 1–7 are allotted addresses "D000H-DFFFG". The internal RAM 34 of the CPU 26 (FIG. 2) is accessed at addresses "FE00H-FFFFH".

FIG. 4 shows a memory map of the external ROM 44 included in the monochrome game cartridge 14. A registration data area 44a pre-stores logo data for verifying (in a manner described below) whether an inserted cartridge is a proper cartridge, and pre-stores the color-unreadiness code. A program area 44b stores the game program. A data area 44c includes background character data and object character data. In this embodiment, the color-unreadiness code is set as a code different from a color-readiness code. The color-unreadiness code may be, for example, "00000000", as shown in FIG. 9.

As for the background character data, monochrome tone data (4 tones) and character codes are set separately for each of the individual background characters BG0–BGm. The object character data includes monochrome tone data (4 tones), coordinate data, character codes, attribute data and register designation data that are set separately for each of the individual object characters OBJ0–OBJn.

FIG. 5 shows a memory map of the external ROM 42 included in the color game cartridge 12. A registration data area 42a pre-stores logo data similar to that stored in registration data area 44a in the external ROM 44 of the monochrome game cartridge 14, and the color-readiness code. A program area 42b stores the game program and a machine identification data determining program. The machine identification data determining program is a program for detecting a machine identification data shown in FIG. 10 and determining whether the cartridge is inserted into a monochrome display game machine 18 or into a color display game machine 10. A data area 42c includes background character data and object character data. In this embodiment, "10000000" shown in FIG. 9 is set as the color-readiness code. The external ROM 42 of the color game cartridge 12 further includes a color palette area 42d.

The background character data includes tone data (4 tones), character codes and attribute data that are set separately for each of the individual background characters BG0–BGm. The attribute data includes color palette designating data. The color palette designating data is data for designating one of eight color palettes set for the background characters. For each of these eight color palettes set for the background characters, four different colors are predetermined. The object character data includes tone data (4 tones), coordinate data, character codes and attribute data that are set for each of the individual object characters OBJ0–OBJn. The attribute data includes color palette designating data. The color palette designating data is data for designating one of eight color palettes set for the object characters. For each of these eight color palettes set for the object characters, three different colors are pre-determined.

FIG. 6 shows the color palette area 42d of FIG. 5 in greater detail. Color palette area 42d includes a background (BG) character color palette area 42d1 and an object (OBJ) character color palette area 42d2. The BG color palette area 42d1 includes the eight color palettes mentioned above, that is, BG color palettes 0–7, each of which includes four colors determined by palette data items 0–3. The OBJ color palette area 42d2 includes the eight color palettes mentioned above, that is, OBJ color palettes 0–7, each of which includes three colors determined by palette data items 0–2. Each palette data item is 2-byte (16-bit) data indicating a single color.

By setting color palettes separately for the individual background characters and setting color palettes separately for the individual object characters, it is possible to display color game images in many colors on the color LCD 16 while using a relatively small amount of palette data.

Although it is indicated in FIG. 6 that the palette data items 0–3 are set for the individual OBJ color palettes 0–7, it should be noted that the palette data item 3 is set in the internal RAM 34, not in the external ROM 42.

Figure 7:
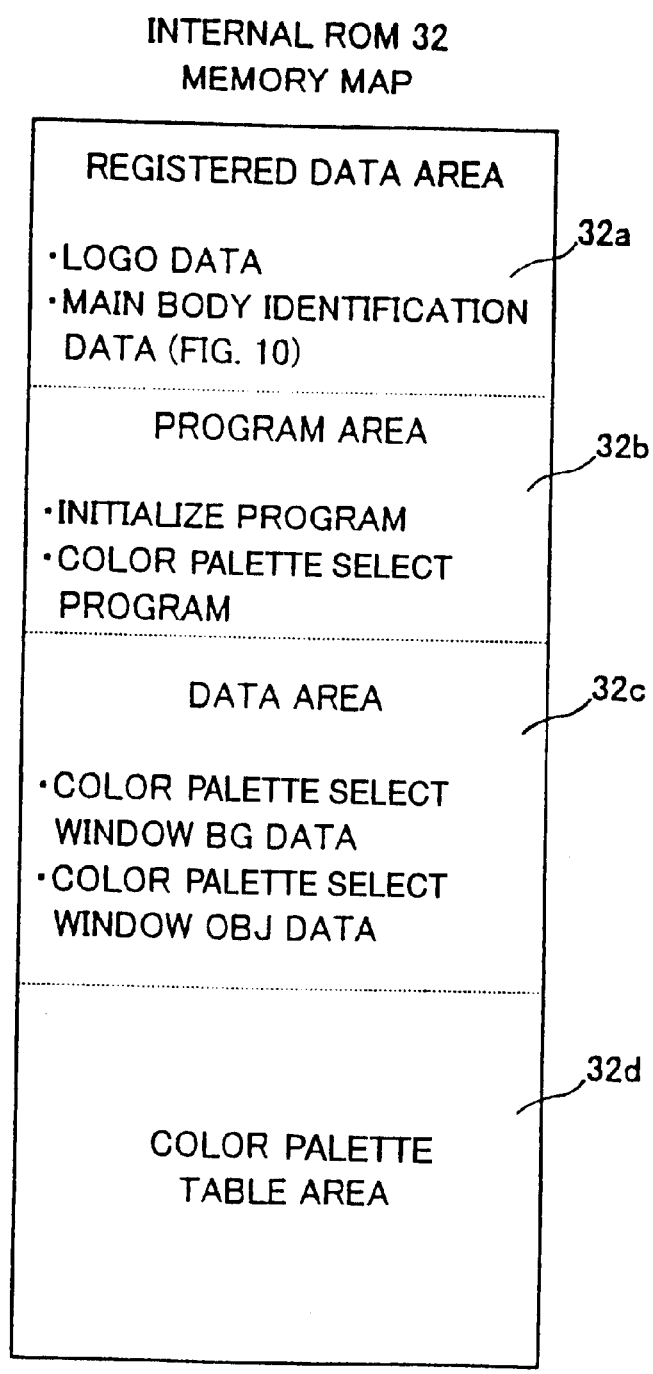
FIG. 7 is a diagram illustrating the memory map of the internal ROM.

FIG. 7 shows a memory map of the internal ROM 32 of the CPU 26 shown in FIG. 2. As in the external ROM 42 or 44 of the cartridge 12 or 14, the internal ROM 32 includes a registration data area 32a, a program area 32b, a data area 32c and a color palette table area 32d. Pre-stored in the registration data area 32a are logo data for verifying the authorization of the game cartridge 12 or 14, that is, the external ROM 42 or 44, and machine identification data shown in FIG. 10. In the color display game machine of this embodiment, machine identification data of, for example, "00010001", is set. Although not directly related to this invention, machine identification data of "00000001" is set in one certain model of the monochrome display game machine 18 shown in FIG. 1, and machine identification data of "11111111" is set in another model thereof.

Figure 15:
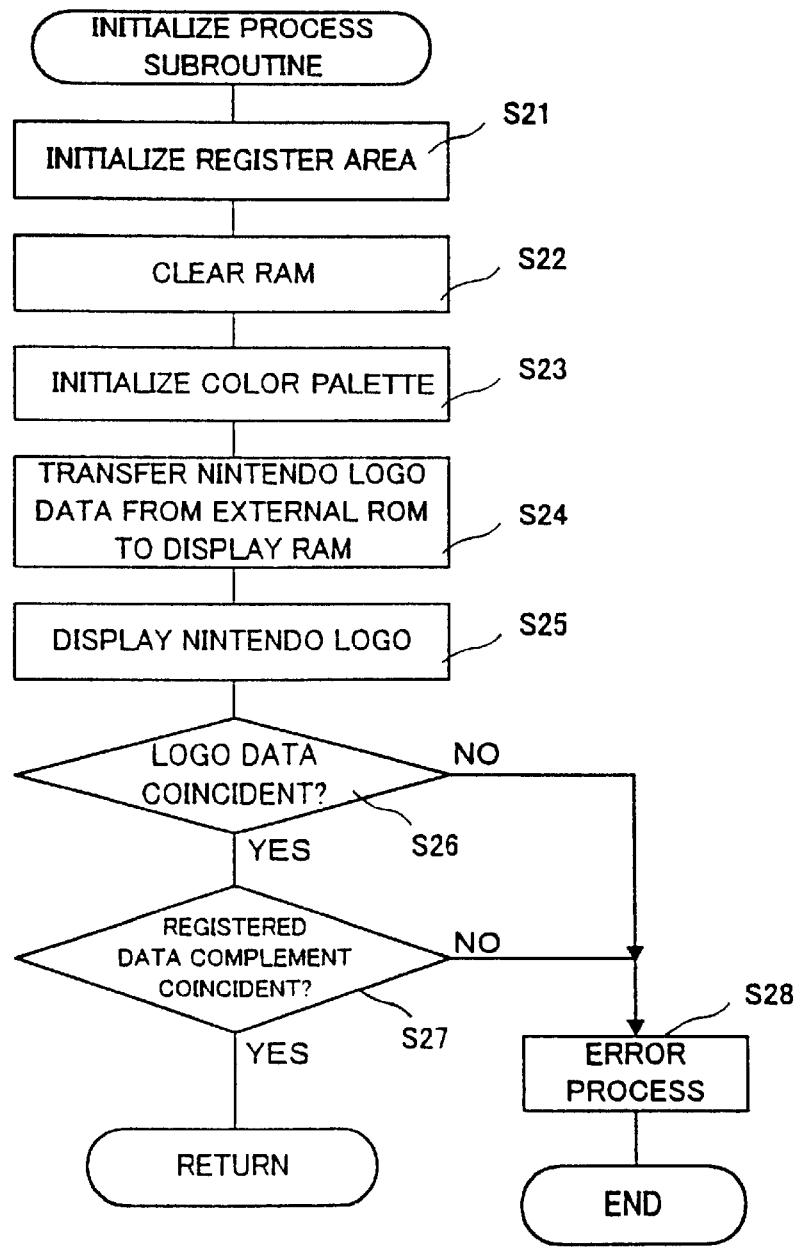
FIG. 15 is a flowchart illustrating the initial setting subroutine.
Figure 19:
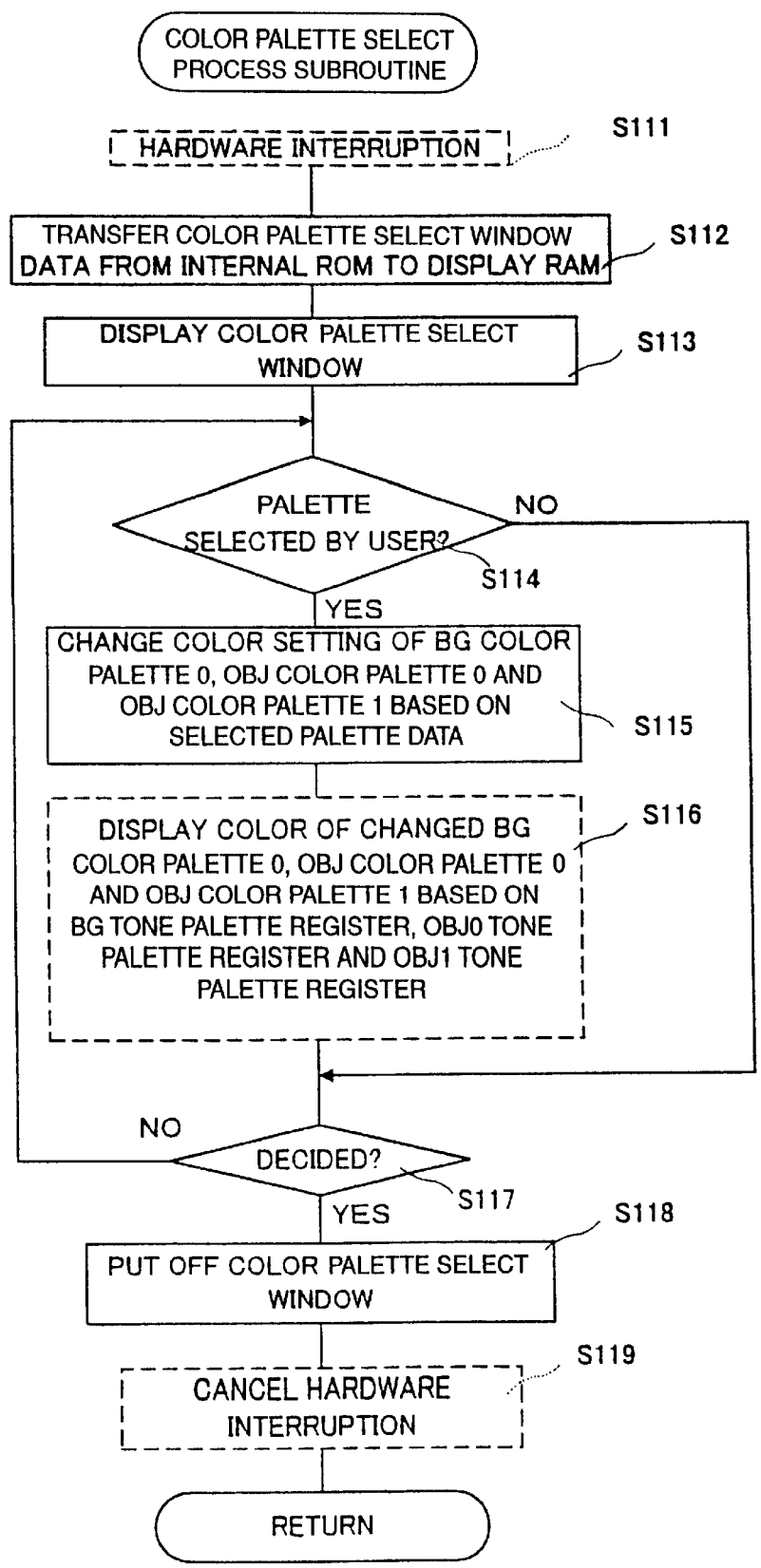
FIG. 19 is a flowchart illustrating the color palette selecting subroutine.

Referring back to FIG. 7, the program area 32b includes an initializing program illustrated in detail in FIG. 15 and a color palette selecting program illustrated in detail in FIG. 19. The initializing program, simply described, is a program for verifying the authorization of a cartridge. According to the program, it is determined whether the logo data set in the registration data area 42a or 44a of the external ROM 42 or 44 conforms to the logo data set in the registration data area 32a of the internal ROM 32. If they conform, the use of the cartridge is permitted.

The color palette selecting program is a program that displays a color palette selecting window 16A on the color LCD 16 (FIGS. 1 or 2) as shown in FIG. 21, so that one of the monochrome game cartridge color palette areas 1-L can be selected for use. The data for displaying the color palette selecting window is set in the data area 32c.

Figure 8:
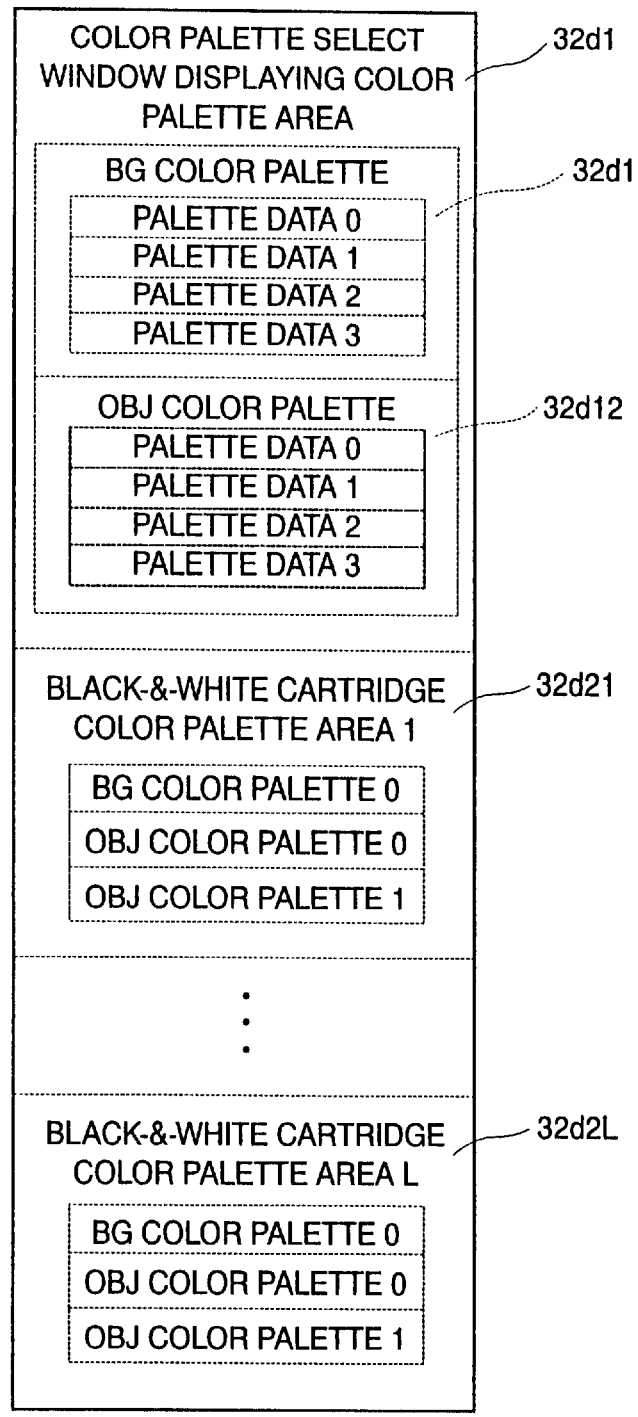
FIG. 8 is a diagram illustrating the detailed memory map of the color palette table area.

The color palette table area 32d is formed of color palette areas that include color data to be displayed in the color palette selecting window 16A and 16B (FIG. 21) and a game screen 16C (FIG. 21). As illustrated in detail in FIG. 8, the color palette table area 32d includes a color palette area 32d1 for displaying the color palette selecting window, and monochrome game cartridge color palette areas 32d21–32d2L (where L is an arbitrary number). The color palette area 32d1 for displaying the color palette selecting window includes a background (BG) color palette 32d11 and an object (OBJ) color palette 32d12. In each of the BG and OBJ color palette areas, palette data 0–3 are set. For each of the monochrome game cartridge color palette areas 32d21–32d2L, a background (BG) color palette and two object (OBJ) color palettes 0, 1 are set.

Figure 13:
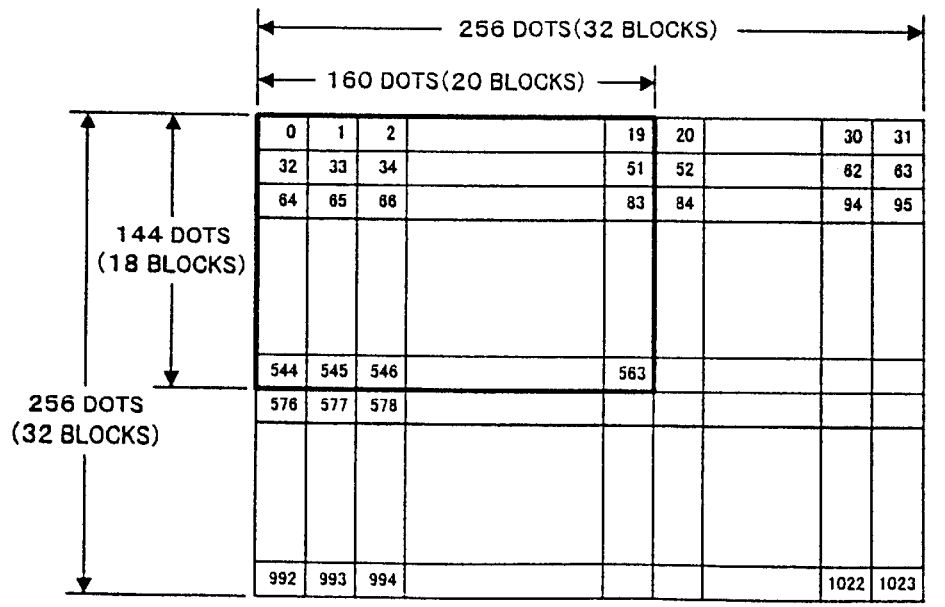
FIG. 13 is a diagram illustrating the correspondence between the BG display area and the LCD display area.

The display RAM 52 forms a display memory for displaying the background characters as described above. In this embodiment, two display memories are formed. As indicated in FIGS. 12 and 13, each display memory has a storage capacity corresponding to a number of blocks (e.g., 1024) that is considerably greater than the number of blocks displayable by the color LCD 16 (e.g., 360). Therefore, the game image displayed on the color LCD 16 can be smoothly scrolled. The display RAM 52 has two banks, each of which includes two display memories. Character data of the background characters developed into dot data and attribute data for each block are written into each bank. The "block" is a 64-dot area formed as 8×8 dots in the screen of the color LCD 16.

Figure 14:
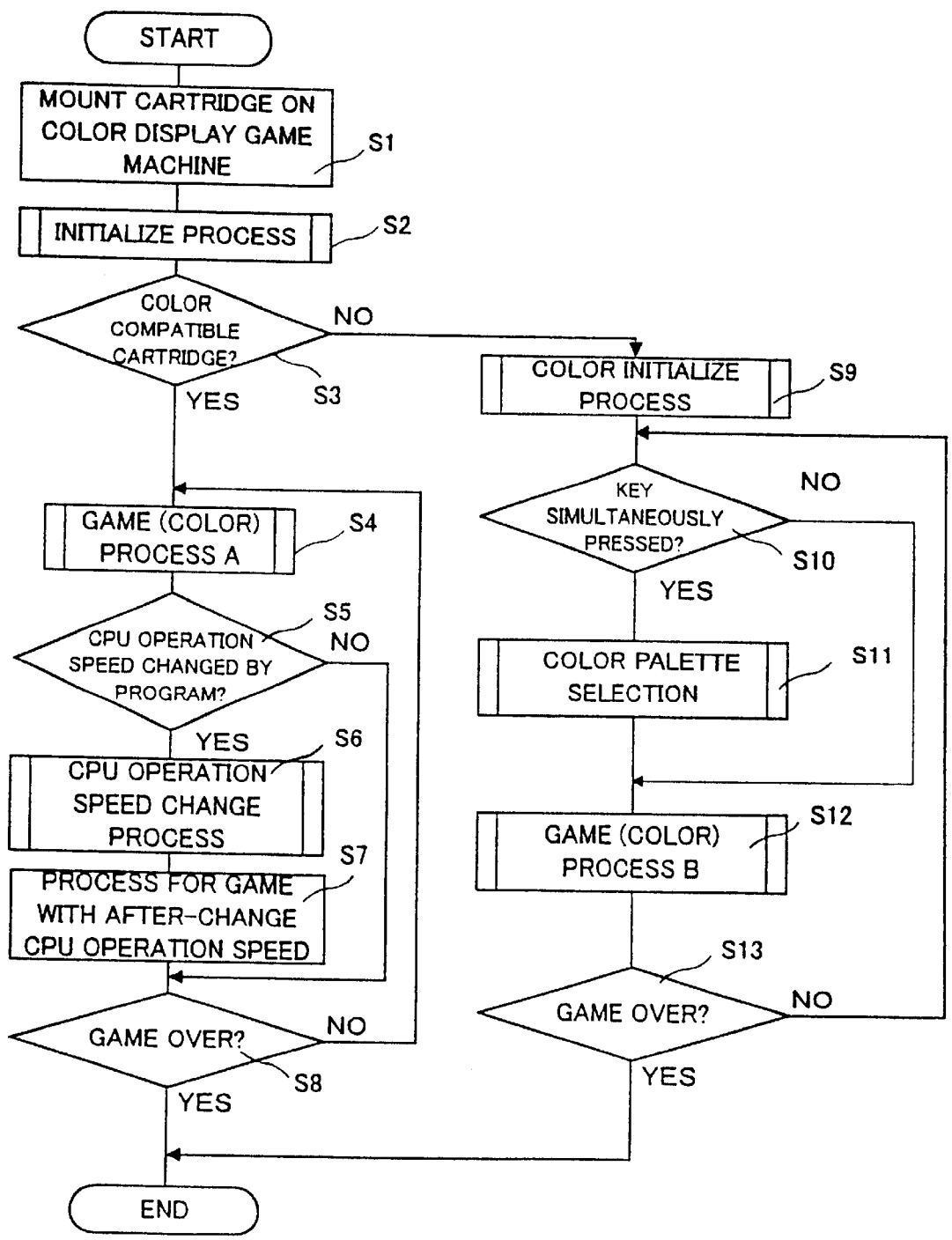
FIG. 14 is a flowchart illustrating the main routine of the game operation according to the embodiment of the invention.

Referring to a main routine of the game operation illustrated in FIG. 14, when the game cartridge 12 or 14 is inserted into the insert opening or port (not shown) of the color display game machine 10 in step S1, the CPU 26 (or more specifically, the CPU core 30 shown in FIG. 2) executes an initial set-up routine in step S2.

In the initial setting routine illustrated in FIG. 15, in the starting steps S21, S22 and S23, the CPU 26 (CPU core 30) initializes the registration area 34c of the internal RAM 34 (FIG. 11); clears the OBJ data area 34a of the internal RAM 34, the display RAM 52 and the extended W-RAM 50; and initializes the color palette area 34b. Subsequently in step S24, the CPU 26 (CPU core 30) reads the logo data from the registration data area 42a or 44a of the external ROM 42 or 44, and transfers the logo data to the character data areas of the display RAM 52 (FIG. 12). In this embodiment, the logo data is data for displaying the logo mark "NINTENDO", which is a registered trademark of Nintendo Co., Ltd. Therefore, in step S25, the logo mark "NINTENDO" is displayed on the color LCD 16. Of course, arbitrary logo data may be used and the logo data for "NINTENDO" is merely provided by way of illustration, not limitation.

Subsequently in step S26, the CPU 26 reads out the logo data set in the registration data area 32a of the internal ROM 32, and compares the logo data with the logo data read from the external ROM 42 or 44 in step S24. Furthermore, in step S27, the CPU 26 determines a complement of the total of the registration data set in the registration data area 42a or 44a of the external ROM 42 or 44, and determines whether this complement matches complement data separately set in the registration data area 42a or 44a of the external ROM 42 or 44.

Steps S26 and S27 are steps for verifying whether the game cartridge inserted into the color display game machine 10 is a proper or valid cartridge. These steps are executed by the initializing program set in the program area 32b of the internal ROM 32 shown in FIG. 7. If the determination in either step S26 or step S27 is negative, it means that the cartridge is improper or invalid. In this case, the CPU 26 executes error processing in step S28, so as to enter an infinite loop in the internal ROM 32. Therefore, the game is not started. Consequently, if an improper or invalid cartridge is inserted into the color display game machine 10, the use of the cartridge is rejected. In this manner, use of improper or counterfeit game cartridges is excluded.

If an affirmative determination is made in both steps S26 and S27, it is determined that the presently inserted cartridge is a proper or valid game cartridge, and operation returns to the main routine illustrated in FIG. 14.

In step S3 of the main routine, the CPU 26 determines whether the inserted game cartridge is a "color-ready" game cartridge 12 or a "color-unready" (monochrome) game cartridge 14. Since each game cartridge has a color-readiness code or a color-unreadiness code pre-set in the registration data area 42a or 44a, the CPU 26 needs only to read out the code and determine whether at least the highest order bit of the code is "1" or "0" in step S3. If the color-unreadiness code "0" is detected in step S3, the CPU 26 determines that the monochrome game cartridge 14 is presently inserted. If the color-readiness code "1" is detected in step S3, the CPU 26 determines that the color game cartridge 12 is presently inserted.

If the color game cartridge 12 is inserted, the game processing (including color processing) is performed in step S4. In the first step S41 of the game (color) processing routine illustrated in FIG. 16, the CPU 26 reads background (BG) color palettes and object (OBJ) color palettes from the color palette area 42d of the external ROM 42, and transfers the color palettes to the color palette area 34d of the internal RAM 34. In step S42, the CPU 26 reads the OBJ data of each object character to be presently displayed from the data area 42c of the external ROM 42 in accordance with the game program. The OBJ data is written into the OBJ data area 34a of the internal RAM 34. Furthermore, in step S43, the character code of each background character to be presently displayed is transferred to the BG display area of the display RAM 52. Subsequently in step S44, the CPU 26 switches the bank of the display RAM 52 to bank 1, and writes the attribute data included in the BG data into separate blocks.

Then in step S45, each background (BG) character is displayed in color on the color LCD 16 by using the BG color palette designated by the color palette designating data included in the attribute data transferred to the display RAM 52. Furthermore, in step S46, each object (OBJ) character is displayed in color on the color LCD 16 by using the OBJ color palette designated by the color palette designating data included in the OBJ data transferred to the internal RAM 34.

Figure 16:
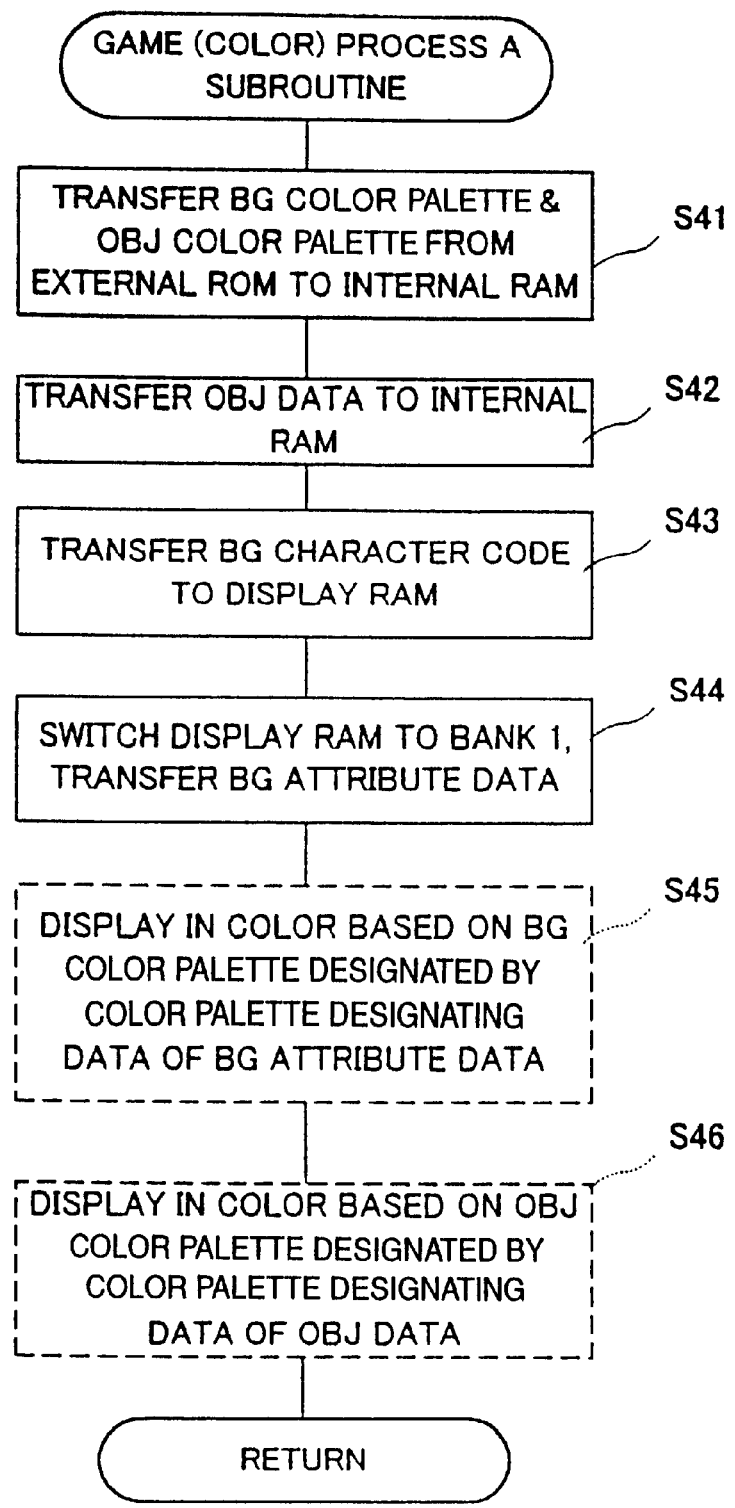
FIG. 16 is a flowchart illustrating the game (color) processing subroutine.

In reality, steps S45 and S46 are executed through hardware processing performed by the color display processing circuit 28 (FIG. 2) included in the CPU 26. In FIG. 16, therefore, steps S45 and S46 are indicated by broken lines. In FIG. 16, the actual game processing (for example, impact determination, score processing and the like) executed by the game program is omitted since such processing is well-known and is not directly related to the invention.

Figure 17:
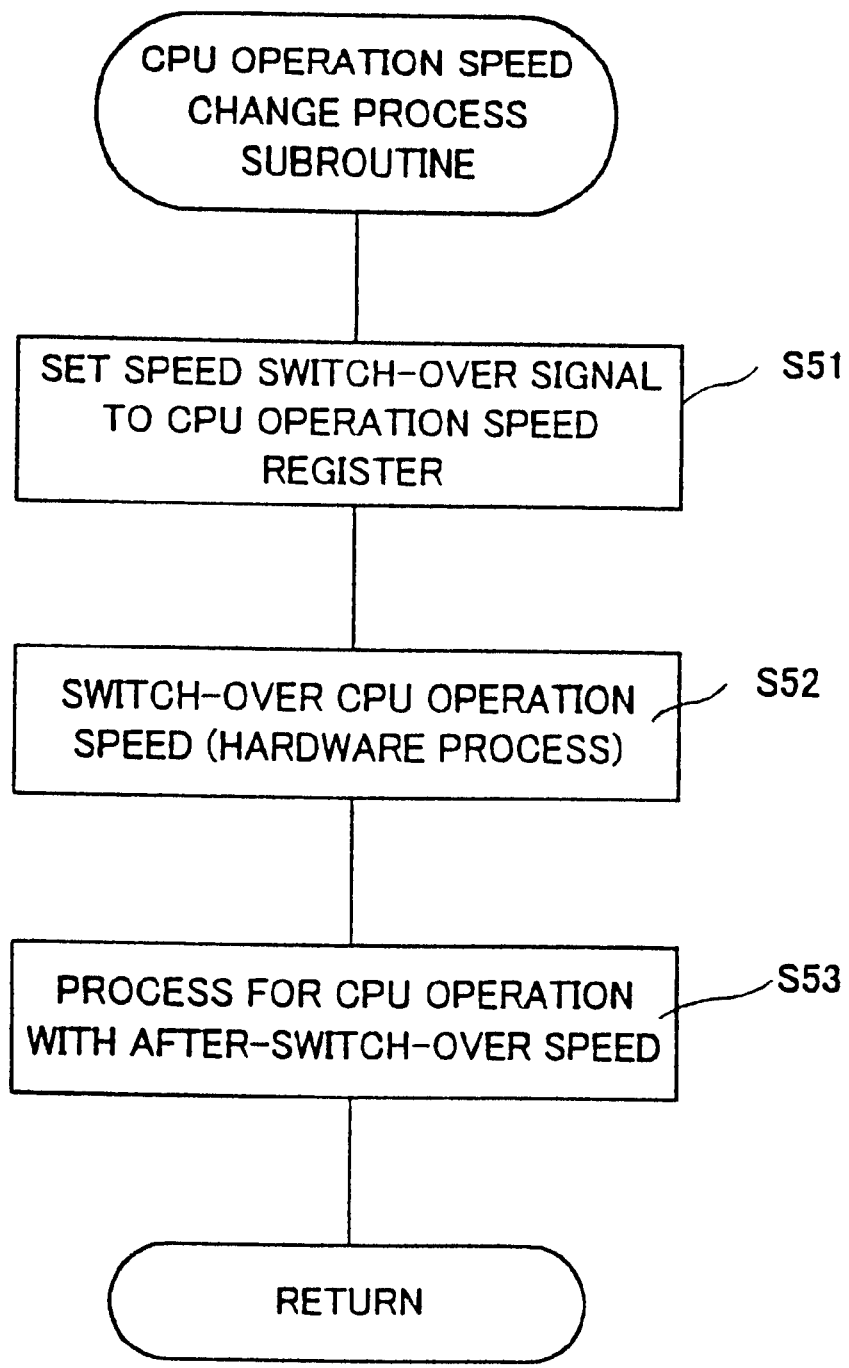
FIG. 17 is a flowchart illustrating the CPU operation speed changing subroutine.

Returning to FIG. 14, in step S5, the CPU 26 determines whether a change of the CPU operation speed is instructed by the game program. If there is a speed changing instruction, a speed changing routine illustrated in FIG. 17 is executed in step S6. In the first step S51 of the CPU operation speed changing routine, a speed changing signal (data) is set in a CPU operation speed register R5 included in the register area 34c of the internal RAM 34. Subsequently in step S52, a frequency division ratio in accordance with the speed changing signal is set in the programmable frequency divider 38 to change the system clock frequency. Therefore, in step S53 and the following steps, the CPU 26 operates in accordance with the thus-changed operation speed. That is, in step S7 and the following steps in the main routine, the game (color) processing is executed at the changed CPU operation speed.

In the above-described operation, if the inserted cartridge is a color game cartridge, the CPU operation speed is generally changed in steps S6 and S7 so that the processing speed becomes higher (e.g., 2.10 MHz) than the speed in the case of the use of a monochrome game cartridge (e.g., 1.05 MHz). This speed change is performed in order to prevent sluggish processing due to an increased number of displayable colors, that is, an increased amount of data. The higher processing speed allows for more elaborate games with better artificial intelligence and more complex game engines.

If game-over is detected in the game (color) processing, that is, in step S8, the main routine of the game operation ends.

If it is determined in step S3 that the inserted cartridge is monochrome game cartridge 14, color initial setting processing is performed in step S9.

Figure 18:
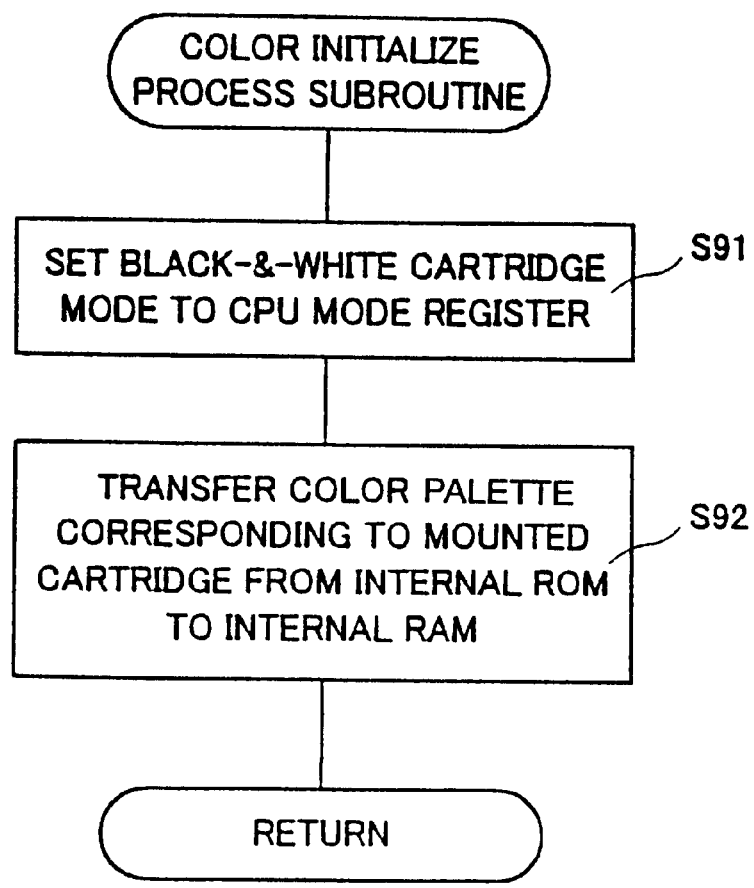
FIG. 18 is a flowchart illustrating the color initial setting subroutine.

In the first step S91 in the color initial setting routine illustrated in FIG. 18, the CPU 26 (CPU core 30) sets a monochrome game cartridge mode in a CPU mode register R4 formed in the register area 34c of the internal RAM 34. Subsequently in step S92, the color palette corresponding to the inserted monochrome cartridge is read from the color palette areas 32d21–32d2L in the internal ROM 32, and written into the color palette area 34a in the internal RAM 34.

Figure 20:
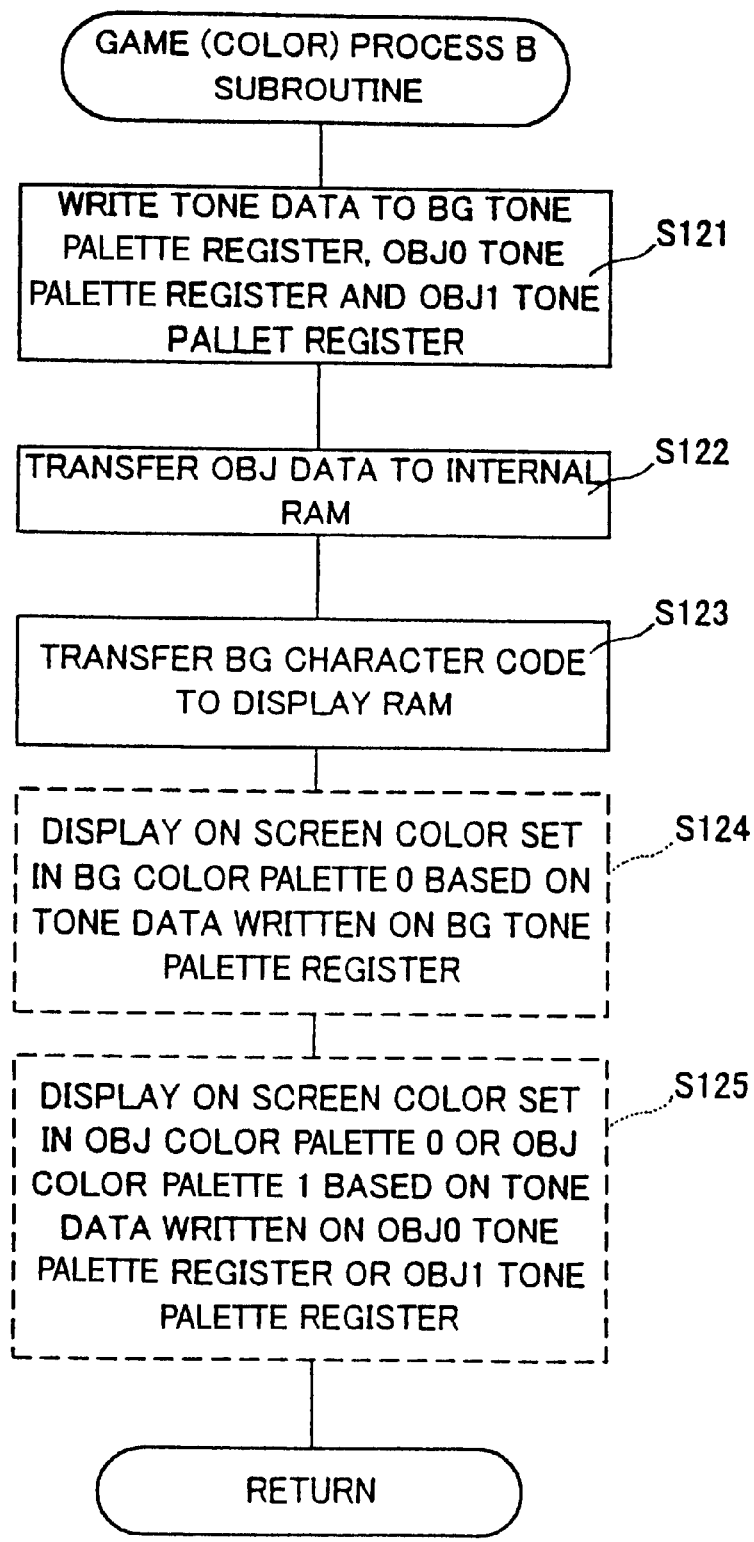
FIG. 20 is a flowchart illustrating the game (color) processing subroutine.

More specifically, in step S121 of the game (color) processing routine (FIG. 20) executed in step S12, the CPU 26 writes the BG tone data set in the data area 44c of the external ROM 44 into the BG tone palette register R1, and writes the OBJ tone data set in the data area 44c of the external ROM 44 into the OBJO tone palette register R2 or the OBJ1 tone palette register R3. In step S122, the CPU 26 reads the OBJ data of the object character that needs to be presently displayed out of the data area 44c of the external ROM 44, and writes the OBJ data into the OBJ data area 34a of the internal RAM 34, in accordance with the game program. Subsequently in step S123, the character code of the background character that needs to be presently displayed is transferred to the BG display data area of the display RAM 52.

After the setting of a given monochrome game cartridge color palette and the BG tone data and the OBJ tone data into the internal RAM 34 in the above-described manner, the color display processing circuit 28 (FIG. 2) color-displays the background (BG) character on the color LCD 16 by using the colors set in the BG color palette 0, on the basis of the tone data written in the BG gradation palette register R1, in step S124. Subsequently in step S125, the color display processing circuit 28 displays in color the object (OBJ) character on the color LCD 16 by using the colors set in the OBJ color palette 0 or the OBJ color palette 1, on the basis of the tone data written in the OBJO gradation palette register R2 or the OBJ1 palette register R3, in accordance with the register designation data set in the data area 44c of the external ROM 44.

In every execution of the main routine, it is determined in step S10 whether a color palette changing request is inputted by a user or player. In this embodiment, if any two of the operating keys 48a–48e are simultaneously pressed, it is assumed that the color palette changing request has been inputted, and processing is accordingly performed. That is, if the simultaneous pressing of two keys is detected in step S10, a color palette selecting routine in step S11 is performed.

In step 111 of the color palette selecting routine illustrated in FIG. 19, a hardware interrupt is inputted by the simultaneous pressing of two operating keys. Subsequently in step S112, the background (BG) data of the color palette selecting window set in the data area 32c of the internal ROM 32 is transferred to the display RAM 52 in accordance with the color palette selecting program set in the program area 32b of the internal ROM 32, so that the window 16A and the cursor 16B shown in FIG. 21 are displayed on the color LCD 16.

Subsequently in step S114, the CPU 26 determines whether a color palette has been selected by the user or player. Since the user or player uses one of the operating keys 48a–48e to select a color palette, the CPU 26 can determine whether a color palette has been selected, by determining whether the operating key concerned has been operated.

If the user or player selects a color palette, the determination in step S114 becomes affirmative. Subsequently in step S115, the CPU 26 changes the palette (color) data in the BG color palette 0, the OBJ color palette 0 and the OBJ color palette 1 in the color palette area 34b of the internal RAM 34, in accordance with the selected palette data. Subsequently in step S116, the palette data changed in step S115; that is, the BG color palette 0, the OBJ color palette 0 or the OBJ color palette 1, are written into the color palette area 34b of the internal RAM 34, by using the color palette writing designation registers R10 and R11, so that the colors of the color palette selected by the user are displayed in the window 16A shown in FIG. 21.

Subsequently, if it is determined in step S117 that a decision button has been pressed, or that the color palette selected has been canceled by the user or player, the CPU 26 stops displaying the window 16A and the cursor 16B in step S18, and cancels the hardware interruption in step S19.

In this manner, it is possible for the user or player to appropriately change or select the color palettes, that is, the BG color palette and the OBJ color palettes, which are to be displayed in accordance with the monochrome tone data, during execution of the game using the monochrome game cartridge 14.

Therefore, in the game (color) processing routine executed following step S11 (FIG. 14), the BG and OBJ characters are color-displayed in accordance with the color palettes selected by the user.

However, in a case where the color game cartridge 12 is inserted into the monochrome display game machine 18, it should be understood that only the BG tone (gradation) data and the OBJ tone (gradation) data in the data area 42c are used, so that each character is displayed in monochrome tones.

Of course, routines other than the routine described above may be provided to permit user selection of a color palette. For example, the color display game machine 10 may be configured to permit selection of different color palettes for the color-display operation for monochrome cartridges when the game machine is first turned on. A color palette may be selected (with reference to a user's manual, for example) by pressing various ones or combinations of the operating keys 48a–48e when the logo data is displayed on screen 16 after the game machine is turned on. For example, one of twelve different color palettes may be selected using the following keys or key combinations:

| PRESS | COLOR | PRESS | COLOR |
| --- | --- | --- | --- |
| Up (using 48a) | Brown | Left (using 48a) | Blue |
| Up + 48e | Red | Left + 48e | Dark Blue |
| Up + 48d | Dark Brown | Left + 48d | Gray |
| Down (using 48a) | Pale Yellow | Right (using 48a) | Green |
| Down + 48e | Orange | Right + 48e | Dark Green |
| Down + 48d | Yellow | Right + 48d | Reverse |

Thus, by simultaneously pressing "Up" using the cross key 48a and key 48e, the "Red" color palette may be selected. Of course, other keys and key combinations and different color palettes may be utilized and the above examples are provided by way of illustration, not limitation. In this particular implementation, the color palette may not be changed, for example, after the game title screen appears. This may, for example, avoid accidentally changing the color palette during game play.

Figure 22:
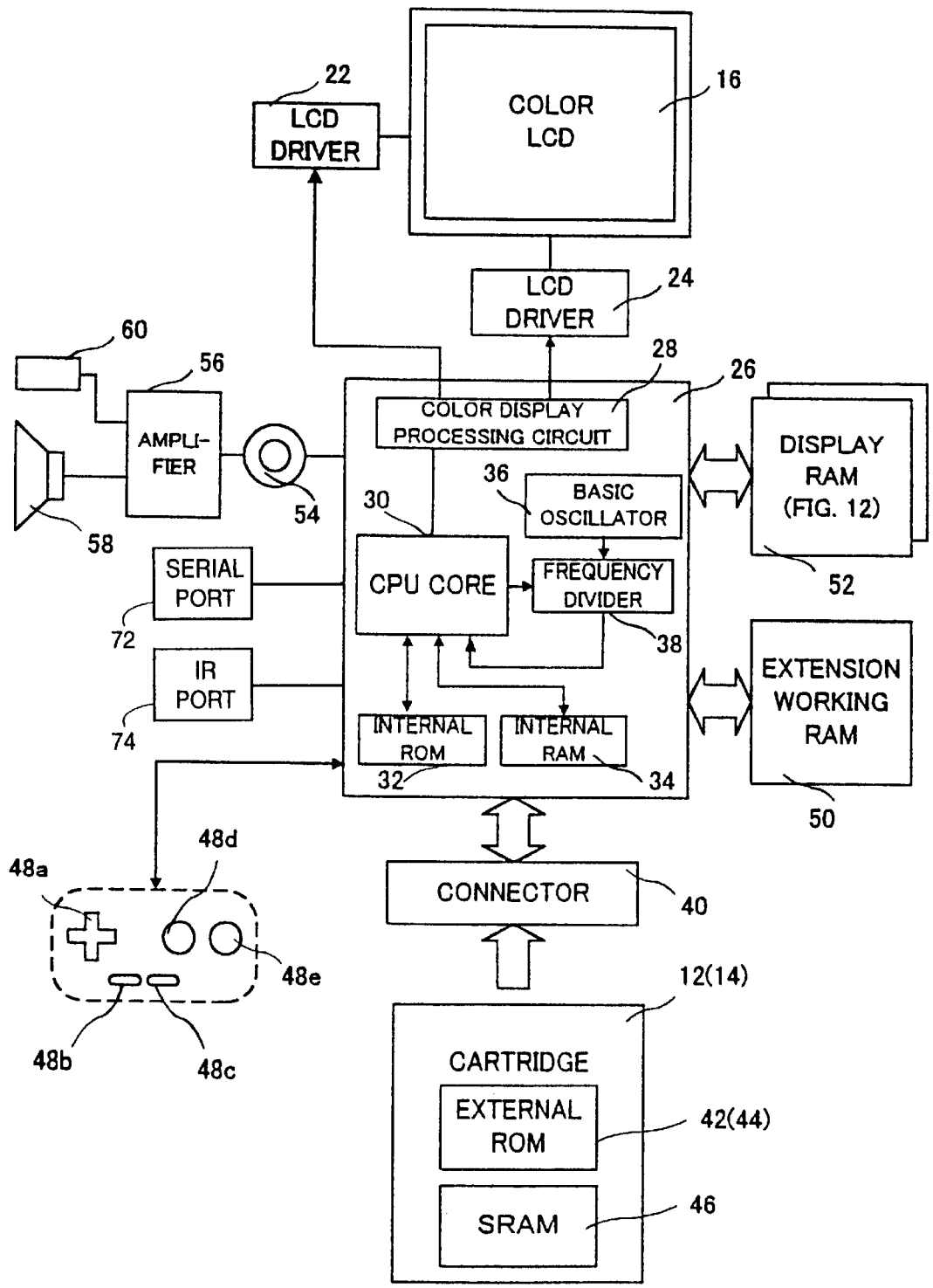
FIG. 22 is an overall block diagram of the color cartridge and color display game machine according to another embodiment of the present invention.

FIG. 22 is an overall block diagram of the color cartridge and color display game machine according to another embodiment of the present invention. In this embodiment, the color display game machine 10 is provided with a serial port 72 and an IR communications port 74. The serial port 72 allows connections to other game machines for multi-player games, to a printer, or to the Internet. The IR communications port 74 provides for data transfer from one game machine to another without the need for a wired connection between the machines. In order to provide compatibility, the lower processing speed of the color display game machine may be set when the color display game machine is connected via the serial port 72 to a game machine which utilizes the lower processing speed.

Color display game machine 10 may be configured to provide background character mirroring in order to reduce data redundancy, thereby saving space in the video RAM or in the game cartridge. Character mirroring involves flipping a character about a vertical and/or horizontal axis. For example, FIG. 23 shows a circle that is displayed using four (2×2) characters 81–84. Without character mirroring, the video RAM would store for each character 81–84 the data for that character's portion of the circle. It can be seen, however, that the circle can be generated by "mirroring" or flipping operations involving one of the characters 81–84, say character 81. Thus, rather than storing the four characters 81–84 making up the circle, the video RAM or game cartridge may store one of the four characters along with certain flags indicative of mirroring or flipping operations required to generate the circle. This obviously saves space in the video RAM or game cartridge. For example, the video RAM of the color display game machine can hold up to some predetermined number of characters at any one time. These characters are used to create the various objects and the various backgrounds. By reducing the number of characters required to generate some of the backgrounds using mirroring, space in the video RAM becomes available for the display of even more elaborate and detailed screens.

Color display game machine 10 may be configured to utilize direct memory access during the horizontal and/or vertical blanking periods in order to transfer data to the screen more quickly. Specifically, this direct memory access allows graphic data to be sent directly from a game cartridge to the video RAM of the color display game machine. The microprocessor is freed from involvement with the data transfer, thus speeding up overall operation. This is an advantage in supporting the additional data required for color display, but also provides smoother scrolling and better animation. In one implementation, the direct memory access operation occurs at the higher clock speed regardless of the currently set speed of the microprocessor. As an example, suppose a screen has 154 lines of which 145 are for display and the remaining 9 correspond to the vertical blanking period. 2048 total bytes may be transferred from the game cartridge to the video RAM during the 145 horizontal blanking periods (one blanking period for each of the display lines) and 2048 total bytes may be transferred to the video RAM during the 9 full lines corresponding to the vertical blanking period.

As noted above, either monochrome or color game cartridges may be used with color display game machine 10. So-called dual mode game cartridges are also usable with color display game machine 10. These game cartridges are "dual mode" because they can also be used with monochrome display game machine 18. In one implementation, a single dual mode game cartridge has two game programs and two sets of screen data. One game program and set of screen data is for use with the monochrome display game machine 18 and the other game program and set of screen data is for use with the color display game machine 10. A small bootstrap or start-up program determines which type of game machine is being used and launches the appropriate game program. In another implementation, the dual mode cartridge stores a core game program which is executed regardless of which type of video game machine is used. Artwork and certain functions and subroutines are substituted during the game depending on whether the game is running on a color display game machine or a monochrome display game machine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A storage medium for a portable game machine, said storage medium being removably attachable to said portable game machine so as to supply data and a program to an image processor of said portable game machine, said storage medium being characterized in that both tone data and color data are pre-stored for image display, and one of the tone data and the color data is selectively processed by said image processor of said portable game machine.

2. The storage medium according to claim 1, wherein the color data includes color palette data, and said image processor of said portable game machine outputs a display signal comprising a background character image and a display signal comprising an object character image, and the color palette data includes background color palette data used for the background character image and object color palette data used for the object character image.

3. A computer-readable medium for use with a hand-held display system that comprises a liquid crystal display, user operable input devices, and processing circuitry that generates a display on the liquid crystal display for a video game based on a video game program stored on said computer-readable medium and user inputs from the input devices, the computer-readable medium having stored thereon a data structure comprising the video game program; background character data for each of a plurality of background characters for the video game; and object character data for each of a plurality of object characters for the video game, the character data for each background and object character including tone data for use with monochrome display processing circuitry and color data for use with color display processing circuitry.

4. The computer-readable medium according to claim 3, wherein the color data for the background characters includes palette designating data for designating one of a plurality of background character color palettes and the color data for the object characters includes palette designating data for designating one of a plurality of object character color palettes.

5. The computer-readable medium according to claim 4, wherein the palette designating data for the background characters designates one of eight background character color palettes and the palette designating data for the object characters designates one of eight object character color palettes.

6. The computer-readable medium according to claim 5, wherein each background character color palette has four colors and each object character color palette has three colors.

7. The computer-readable medium according to claim 3, wherein the tone data for the object characters is four-tone data and the tone data for the background characters is four-tone data.

8. The computer-readable medium according to claim 3, wherein the data structure further comprises color compatibility data.

9. The computer-readable medium according to claim 3, wherein the data structure further comprises logo data.

10. The computer-readable medium according to claim 3, wherein the data structure further comprises a machine identification data determining program for determining the type of processing circuitry of the hand-held display system.

11. The computer-readable medium according to claim 3, wherein the computer-readable medium is read-only.

12. A method for generating display data for background characters and object characters of a video game played on a hand-held display system comprising a liquid crystal display and user operable input devices, the method comprising the steps of:

operatively connecting processing circuitry to a computer-readable medium having stored thereon a data structure comprising a video game program for the video game, background character data for each of a plurality of background characters for the video game and object character data for each of a plurality of object characters for the video game, the character data for each background and object character including tone data used for monochrome display processing and color data used for color display processing; and generating display data for displaying the background characters and the object characters on the liquid crystal display of the hand-held device in accordance with a processing operation that uses one of the tone data and the color data stored on the computer-readable medium.

13. The method according to claim 12, wherein the color data for the game background characters includes palette designating data for designating one of a plurality of background character color palettes and the color data for the game object characters includes palette designating data for designating one of a plurality of object character color palettes.

14. The method according to claim 13, wherein the palette designating data for the game background characters designates one of eight background character color palettes and the palette designating data for the game object characters designates one of eight object character color palettes.

15. The method according to claim 13, wherein each background character color palette has four colors and each object character color palette has three colors.

16. The method according to claim 12, wherein the tone data for the game object characters is four-tone data and the tone data for the game background characters is four-tone data.

17. The method according to claim 12, wherein the data structure of the computer-readable medium further comprises color compatibility data.

18. The method according to claim 12, wherein the data structure of the computer-readable medium further comprises logo data.

19. The method according to claim 12, wherein the data structure of the computer-readable medium further comprises a machine identification data determining program for determining the type of display processing of hand-held device with which the computer-readable medium is used.

20. The method according to claim 12, wherein the computer-readable medium is a read-only computer-readable medium.

21. A hand-held display system for playing a video game comprising:

a housing grippable by a user's hands;

a liquid crystal display viewable by the user gripping the housing;

input devices operable by the user when the user grips the housing;

a connector for operatively connecting to a computer-readable medium having stored thereon a data structure comprising a video game program for the video game; background character data for each of a plurality of background characters for the video game; and object character data for each of a plurality of object characters for the video game, the character data for each background and object character including tone data for use with monochrome display processing circuitry and color data for use with color display processing circuitry;

processing circuitry for processing the video game program, user inputs from the input devices and one of the tone data and the color data stored on the computer-readable medium in order to display the background characters and the object characters on the liquid crystal display.

22. The hand-held display system according to claim 21, wherein the data structure of the computer-readable medium further comprises a machine identification data determining program for determining the type of processing circuitry of the hand-held device with which the computer-readable medium is operatively connected.

23. The hand-held display system according to claim 21, wherein the computer-readable medium is a read-only computer-readable medium.

24. The hand-held display system according to claim 21, wherein the user input devices include one or more buttons.

* * * * *